(12) United States Patent
Blackmore et al.

(10) Patent No.: US 7,135,087 B2
(45) Date of Patent: Nov. 14, 2006

(54) APPARATUS AND METHOD FOR THE REPAIR AND STABILIZATION OF UNDERGROUND PIPES

(75) Inventors: Richard Blackmore, Houston, TX (US); William Lepola, Magnolia, TX (US)

(73) Assignee: Verline Inc., Houston, TX (US)

( * ) Notice: Subject to any disclaimer, the term of this patent is extended or adjusted under 35 U.S.C. 154(b) by 254 days.

(21) Appl. No.: 10/770,735

(22) Filed: Feb. 3, 2004

(65) Prior Publication Data
US 2004/0156682 A1 Aug. 12, 2004

Related U.S. Application Data

(63) Continuation-in-part of application No. 10/182,889, filed as application No. PCT/US01/03498 on Feb. 2, 2001, now Pat. No. 7,073,536.

(51) Int. Cl.
*B29C 65/00* (2006.01)
*F16L 1/00* (2006.01)

(52) U.S. Cl. .......................................... 156/293; 138/97

(58) Field of Classification Search ..................... None
See application file for complete search history.

(56) References Cited

U.S. PATENT DOCUMENTS 4,567,708 A    2/1986  Haekkinen
4,768,562 A  * 9/1988  Strand .......................... 138/98
5,911,545 A    6/1999  Heitkamp
6,068,725 A  * 5/2000  Tweedie et al. ............. 156/287
6,521,673 B1   2/2003  Brown
6,634,831 B1  10/2003  Canteri

FOREIGN PATENT DOCUMENTS

DE         3929558    *  3/1991
JP         6-320624   *  11/1994

OTHER PUBLICATIONS

Machine translation of Kamiyama JP 6-320624.*

* cited by examiner

*Primary Examiner*—Justin Fischer
(74) *Attorney, Agent, or Firm*—David McEwing

(57) ABSTRACT

The apparatus and method for eliminating ground water infiltration while stabilizing the ground and repairing underground pipe/conduit and connections is taught in this art. The steps are to first inject, under pressure, expandable structural foam in the space adjacent and outside the pipe while blocking any infiltration of the foam into the interior of the pipe, conduit or connection. Concurrently or separately the inside diameter of the pipe is receiving a structural repair. The result is stabilized ground, elimination of ground water infiltration and repair of the host pipe conduit or connection.

14 Claims, 29 Drawing Sheets

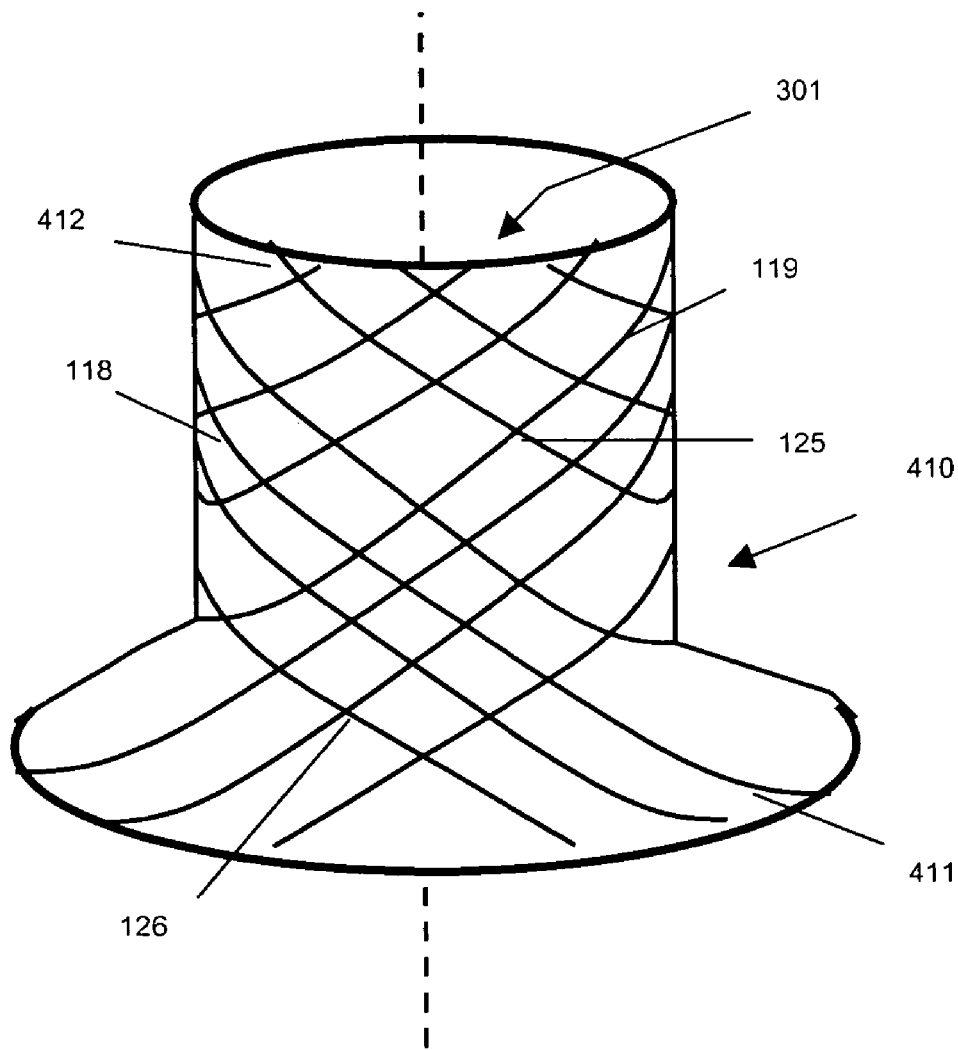
FIG. 6C

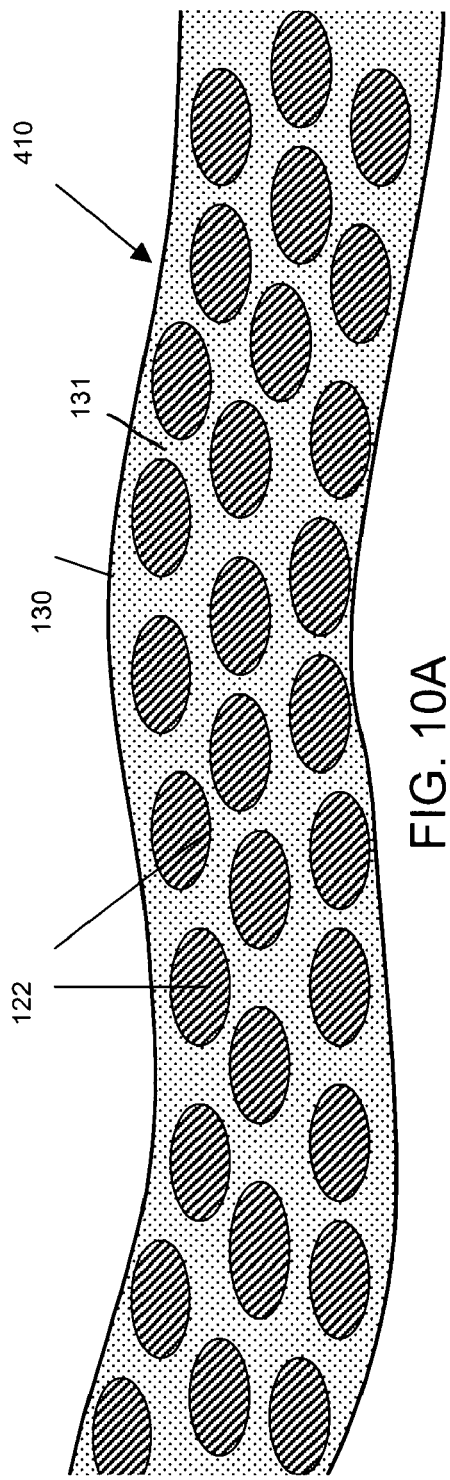
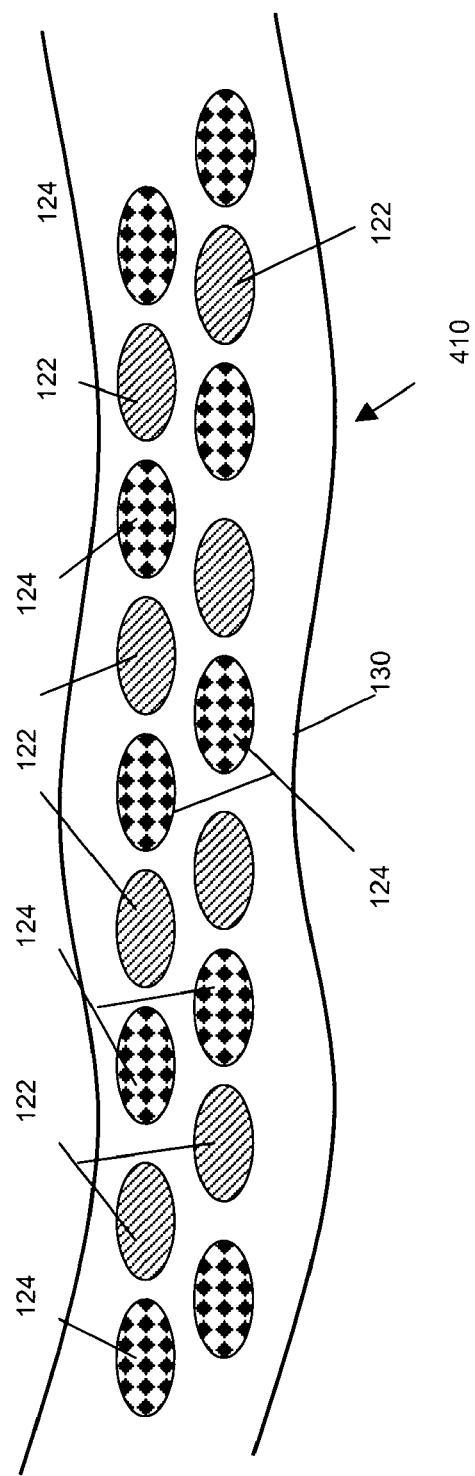

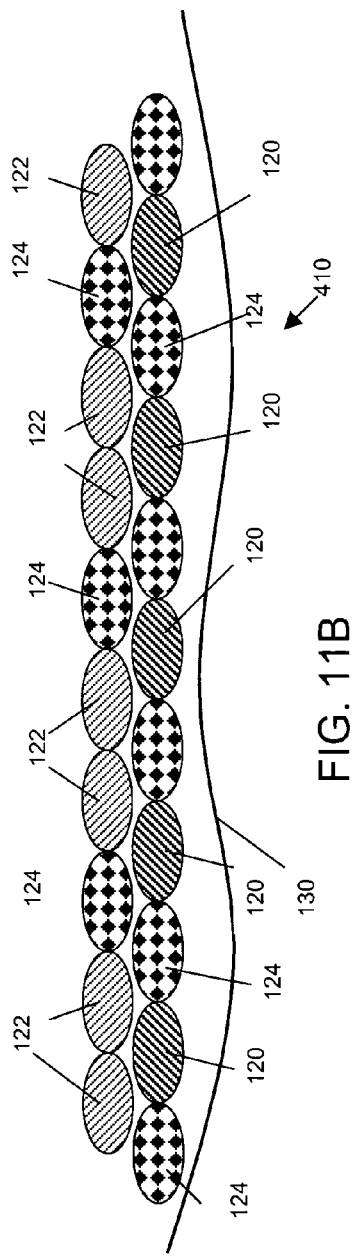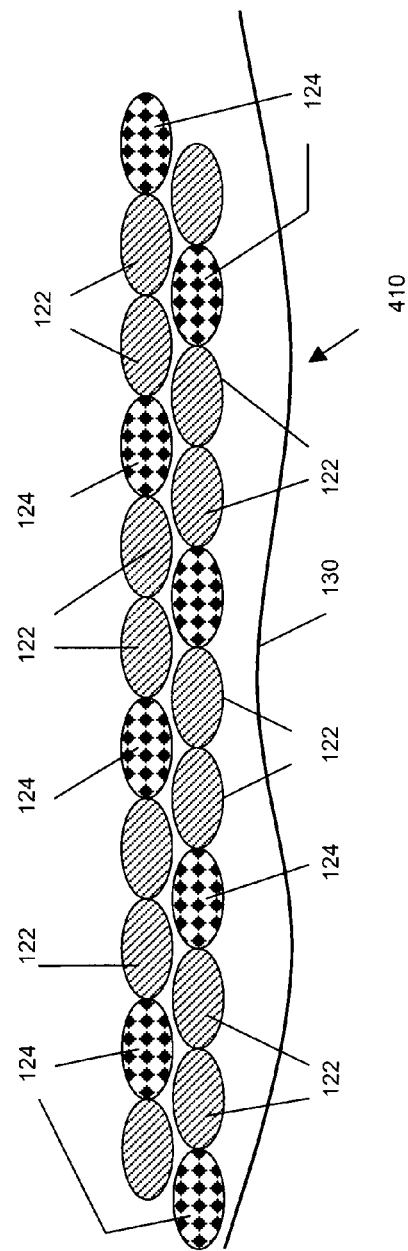
FIG. 11B
FIG. 11A

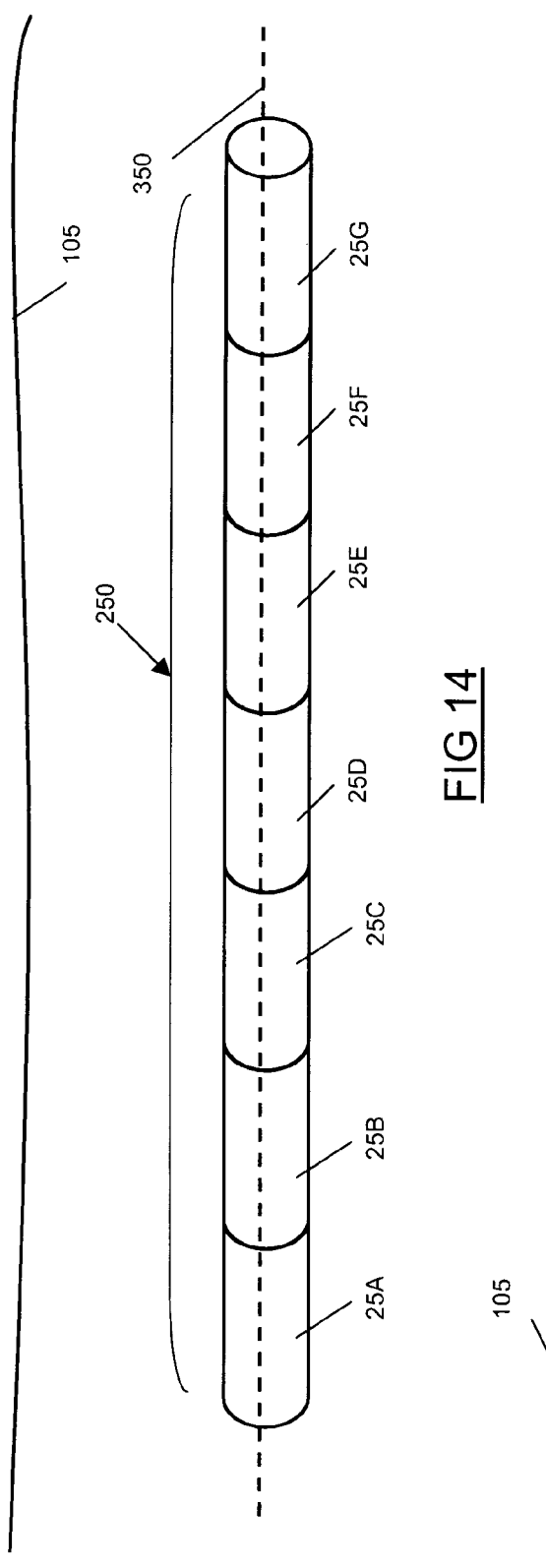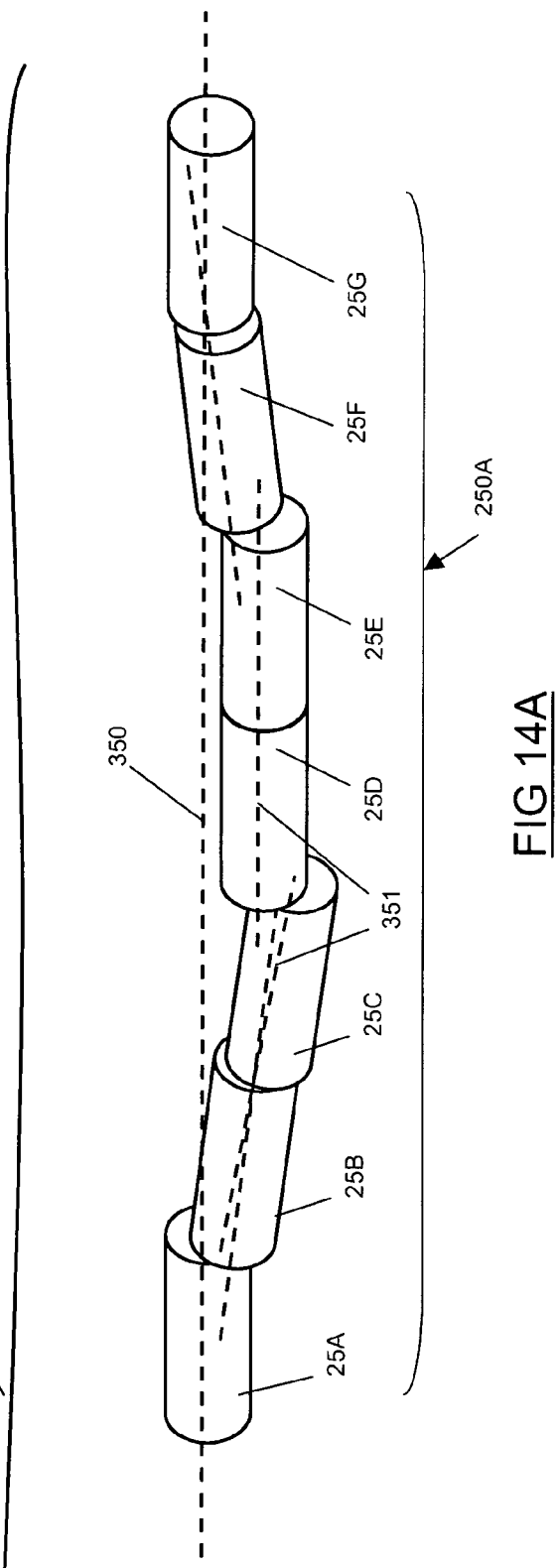

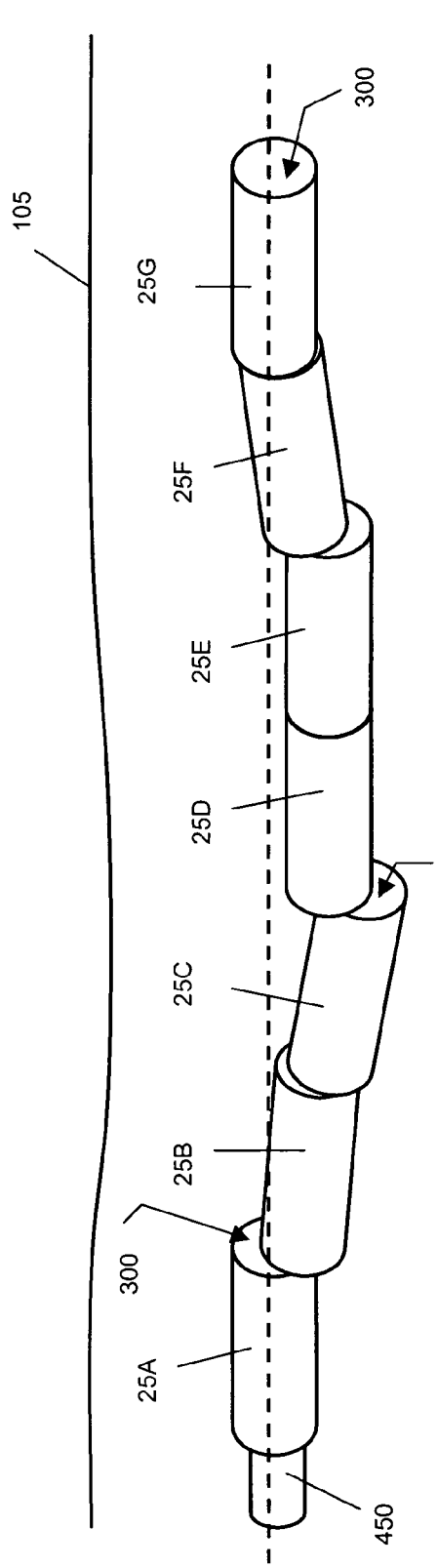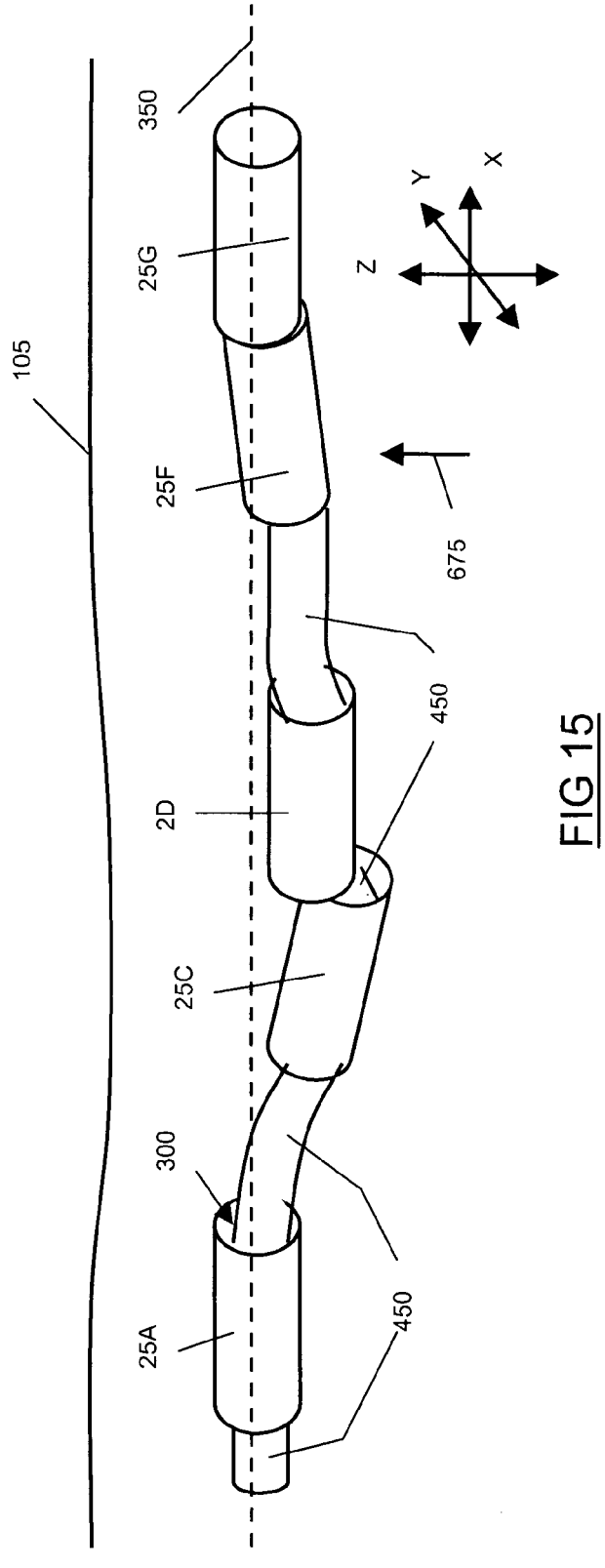

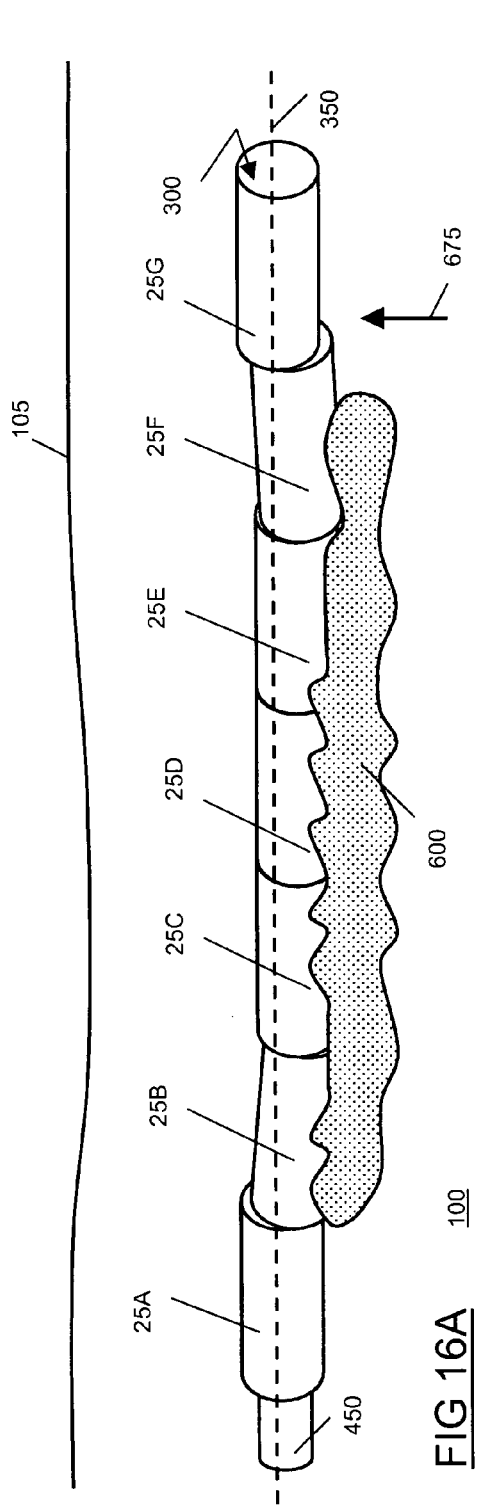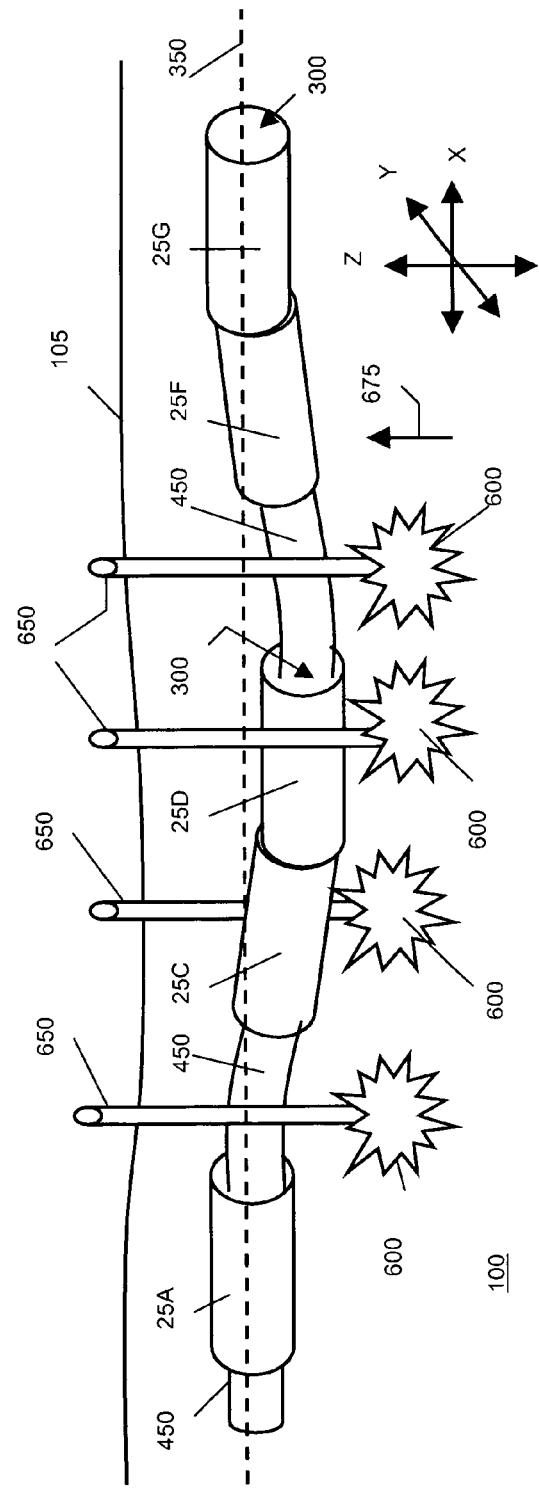

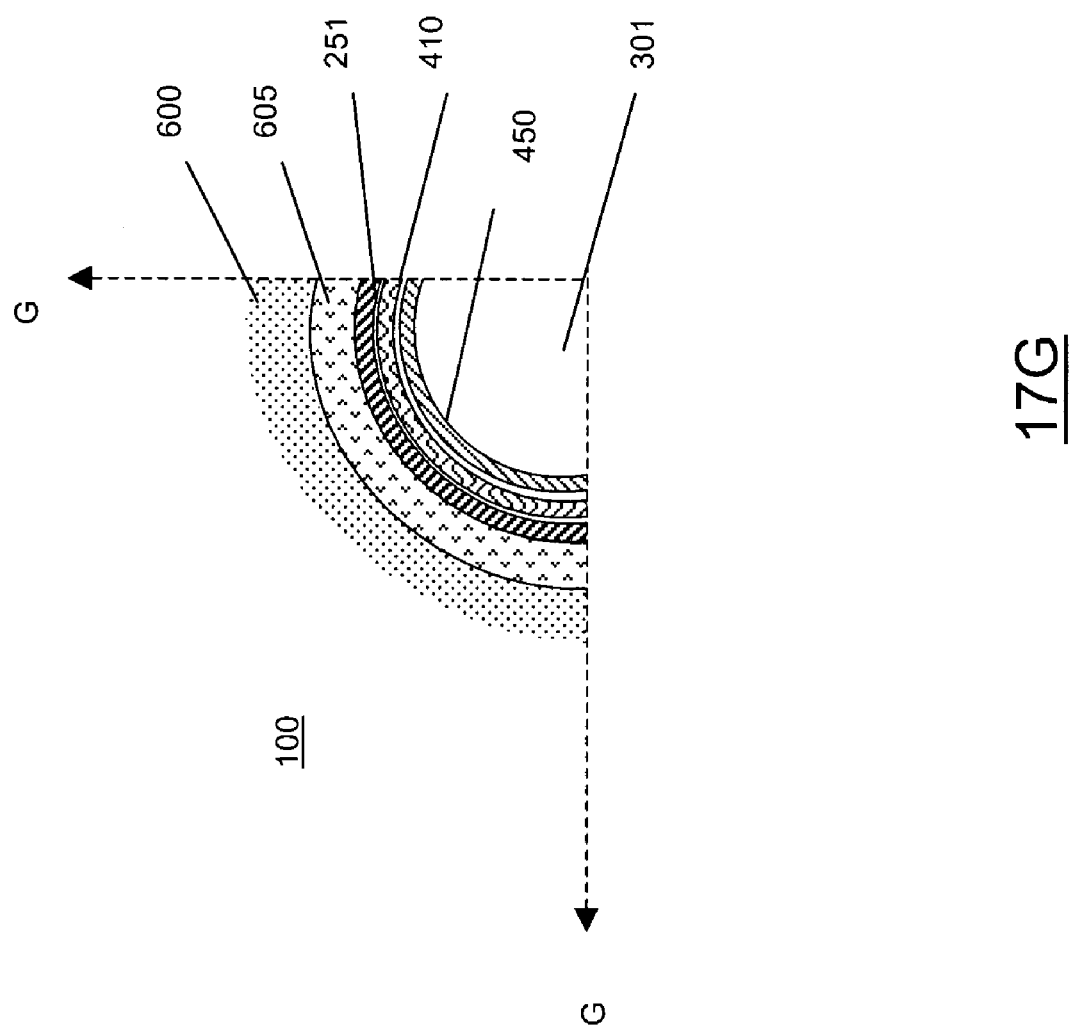

APPARATUS AND METHOD FOR THE REPAIR AND STABILIZATION OF UNDERGROUND PIPES

RELATED APPLICATION

This application is a continuation in part of application Ser. No. 10/182,889 filed Apr. 28, 2003 entitled "Apparatus, Methods, and Liners for Repairing Conduits", now U.S. Pat. No. 7,073,536, which is a U.S. National filing under §371 of International Application No. PCT/US01/03498, filed Feb. 2, 2001.

BACKGROUND OF INVENTION

1. Field of the Invention

The present invention relates to an "insitu" method to repair underground pipes and conduits to reduce or eliminate ground water infiltration while stabilizing the proximate ground formation surrounding the pipes.

2. Background of the Invention

The Clean Water Act has mandated that ground water infiltration into our sewer systems be substantially reduced or eliminated. Many methods of repair have been devised over the last thirty years. Some of those repair methods include slip lining, pipe bursting, cured in place pipe lining (CIPP), fold and form thermoplastic lining, spot repairs, as well as the traditional dig and removal/replacement of pipelines.

It is a known fact that the federal interstate highway system has met and in certain cases exceeded its design life by controlling or reducing incidents of pavement collapse, settling and irregular surfaces. This has been achieved with the development of techniques for the injection of grouts or placement of epoxy patches. In addition, the concrete repair industry has developed and refined the utilization of expandable structural closed cell foams to raise, level and stabilize concrete slabs, foundations, pavements and buildings.

The "insitu lining" repair of pipes has been the most effective alternative to pipe "dig and replacement" for many year. Occasionally an existing annular space or void adjacent to the outside surface of the pipe or conduit has been injected with gelatinous grout materials to eliminate water infiltration into the pipe. This repair has been only temporary since the gelatinous material is not dimensionally stabile and often requires later replacement. The grout is not capable of stabilizing the ground around the pipe even if the entire annular space is filled with the gelatinous grout. The lack of stability and support can result in additional stress on the pipe structure, with eventual degradation of the pipe and resulting water infiltration.

Injection of expanding closed cell foams has seldom been used to repair pipes. Where the closed cell foams have been used to level or reinforce pipe sections, there has been migration of the foam into the pipe/conduit joint that, if left in place, can cause an occlusion or blockage. When this migration into the interior diameter of the pipe does occur, a cutting or grinding device must be inserted as a subsequent step to remove the excess foam.

Another issue is the typical foams being used today are polyurethane's which often contain isocyanate, a groundwater contaminant. Some research has been conducted to determine if the closed cell foam chemistry could be used with grout packers. The blowing agents in the foam, however, create a near immediate reaction that will not allow the annular space to be filled with the foam.

There are hybrid polyester/urethanes expandable closed cell foams that could be used and avoid isocyanate. However, these alternate foam formulations have not been well suited to curing in the ambient underground soil conditions.

The measure of physical properties of materials relevant to the present invention include ASTM D1621 Compressive Strength, ASTM D790 Flexural Strength, ASTM D1622 Density, ASTM C 273 Shear Strength, ASTM D 2126 Dimensional Stability, ASTM D696 Coefficient of expansion, ASTM D 543 Chemical Resistance, and ASTM D 2842 Water Absorption.

SUMMARY OF INVENTION

Insitu pipe repair methods have been developed utilizing techniques for heat assisted cured in place pipe lining ("CIPP") utilizing epoxy repair materials. This technology has allowed the use of styrene free thermosetting or thermoplastic resins in an impregnated ("prepreg") composite repair material that is cured with an expandable and heatable bladder. Thermoset resins are curable resins that can be introduced or impregnated into a fibrous repair material. The curing of the resin results in a change of phase of the resin from a liquid to a solid. As a solid, the repair material continues to have the fiber structure. This technology has been adapted for use in the repair or sealing of pipes or conduits, including sewer mains and lateral lines, ("pipes) and the junctions or interfaces of multiple pipelines.

This invention teaches the use of this technology in combination with the injection of chemical reactants creating expanding closed cell foam ("foaming liquids") for stabilization of the surrounding ground proximate to the underground pipes. The heat assisted CIPP mechanisms and techniques for interior pipe repair thereby allow the use of more environmentally friendly foaming liquids than feasible in ambient conditions to stabilize the ground surrounding the pipe. The inflated bladder can provide a heat source for curing of the resin of the prepreg repair materials, closed cell foaming liquid resin and limiting resin redistribution, and a supporting mechanism for maintaining the pipe diameter and to prevent infiltration of the foam or foaming liquid into the pipe interior.

The invention also teaches use of the expandable bladder alone within the inside diameter of the pipe in combination with the injection of foaming liquids proximate to the exterior of the pipe surface. The invention also teaches use of an expandable and heatable bladder within the inside pipe diameter to assist in the cure of the injected foaming liquids.

The present invention provides for an improved method of stabilizing the adjacent underground soils or formation around the pipe, minimizing ground water infiltration into the pipe, while repairing the host pipe/conduit or connection. The invention also minimizes exfiltration of sewerage from the pipe. Such exfiltration is a problem particularly when the pipe system is fully charged during a rainfall event.

Other benefits of the invention will also become apparent to those skilled in the art and such advantages and benefits are included within the scope of this invention.

BRIEF DESCRIPTION OF THE DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 6C illustrates a detail of the woven repair material for a pipe interface repair.

FIGS. 10 and 10A are cross sectional views of a hybrid woven repair material.

FIGS. 11A and 11B are additional cross sectional views of other hybrid fiber woven repair material.

FIG. 14 is an illustration of multiply aligned pipe segments.

FIG. 14A is an illustration of mis-aligned pipe segments.

FIGS. 15 and 15A illustrate the realignment of pipe segments utilizing the invention.

FIGS. 16 and 16A further illustrate the realignment of pipe segments utilizing the invention.

FIGS. 17A through 17G provide a cross sectional view of the operation of one embodiment of the invention.

DETAILED DESCRIPTION OF THE INVENTION

The above general description and the following detailed description are merely illustrative of the subject invention and additional modes, advantages and particulars of this invention will be readily suggested to those skilled in the art without departing from the spirit and scope of the invention. The teaching of this invention will be understood to be applicable for both the repair or support of sewer pipe connecting interface, as well as for linear and non linear pipelines.

Figure 1:
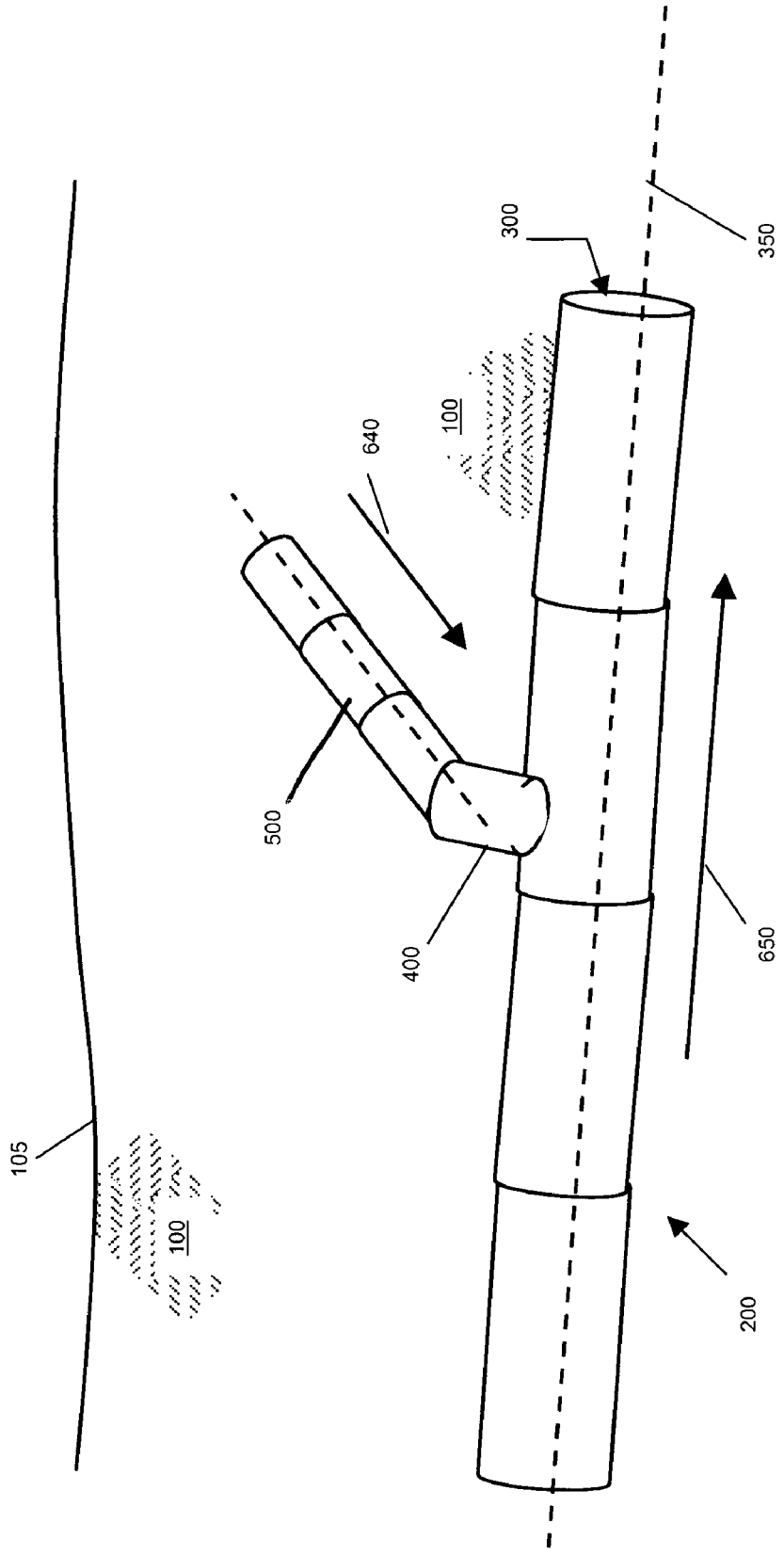
FIG. 1 illustrates a typical sewer pipe and lateral connection.

FIG. 1 illustrates typical underground sewer pipe configuration that can be the object of repair by the method and apparatus of this invention. The pipes comprise a lateral line 500 typically emerging from a single building or home (not shown). The lateral line is installed for gravity drainage 640 into a collector sewer or sewer main pipe 200 through a connection or connecting interface 400. Sewerage is gravity conveyed 650 through the diameter 300 of the sewer pipe 200. The lateral pipe and the main sewer pipe each has a longitudinal axis 350. However, over time, the orientation of the individual pipe segments may change from the original longitudinal axis, creating a "non linear" pipe. (Reference is made to FIGS. 14 and 14A.) Non linear pipe can also, of course, include curved pipe.

Figure 2:
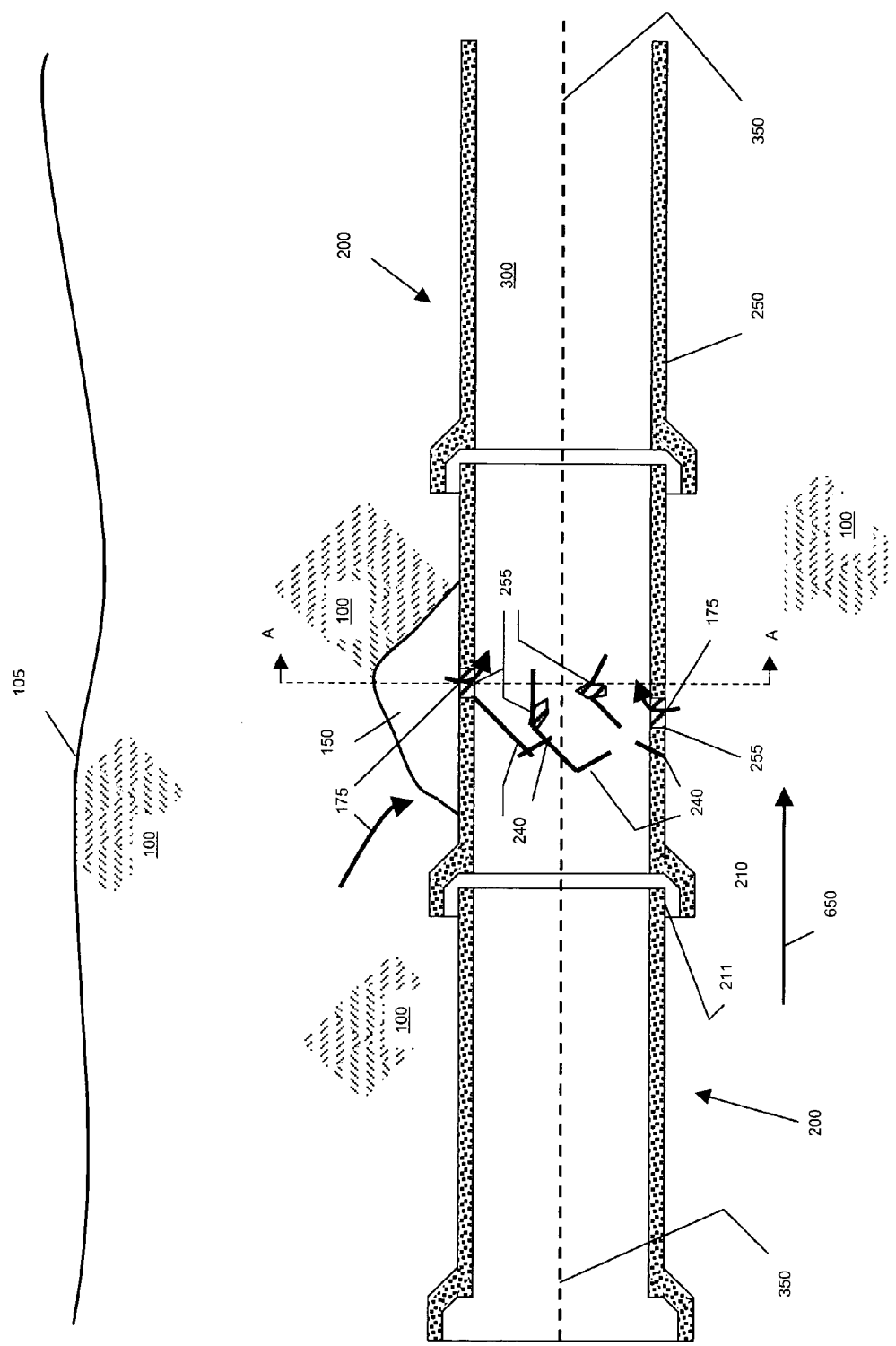
FIG. 2 illustrates typical defects necessitating repair of a sewer pipe and sewer pipe connection.

The lateral pipeline and the main sewer pipe are typically comprised of separate segments jointed by a male-female type connecting end flange. The female flange component 210 and corresponding male component 211 are illustrated in FIG. 2. It will be appreciated that the sewer pipe system is buried within the ground 100 beneath the ground surface 105. The system can be accessed through various ports such as manholes (not shown).

FIG. 2 is a cross sectional schematic of the sewer pipe 200 along the longitudinal axis 350. The direction of the gravity flow of sewerage is shown by vector arrow 650. The male 211—female 210 coupling of the separate sewer pipe sections is also illustrated.

FIG. 2 illustrates a common problem experienced with sewer pipe systems. Due do a variety of causes, including the aging of the pipe material, ground shifts or settlement, etc., ground water 175 migrates into the sewer pipes 200. This can cause the exfiltration of sewerage into the surrounding soil or ground water, particularly when the sewer lines are heavily charged, such as during a significant rain event. Alternatively, the infiltration of ground water can burden the sewerage treatment system thereby increasing treatment costs or causing inadequate treatment. (In addition to the obvious environmental damages that may result from inadequate sewer treatment, the inadequate treatment may result in fines and other damages being imposed by regulatory agencies.)

The infiltration of ground water often carries particles of the adjacent soil 100 into the sewer system, which can overtime result in voids 150 being created surrounding the pipe 200. The creation of voids or increased interstitial spaces results in groundwater collecting proximate to the pipe. This groundwater can then pass, i.e., infiltrate, into the sewer pipe wall 250 through the cracks 240 or holes 255. It can also pass through defects, such as gaps, in the junctions of each pipe segment 210 211.

Figure 2A:
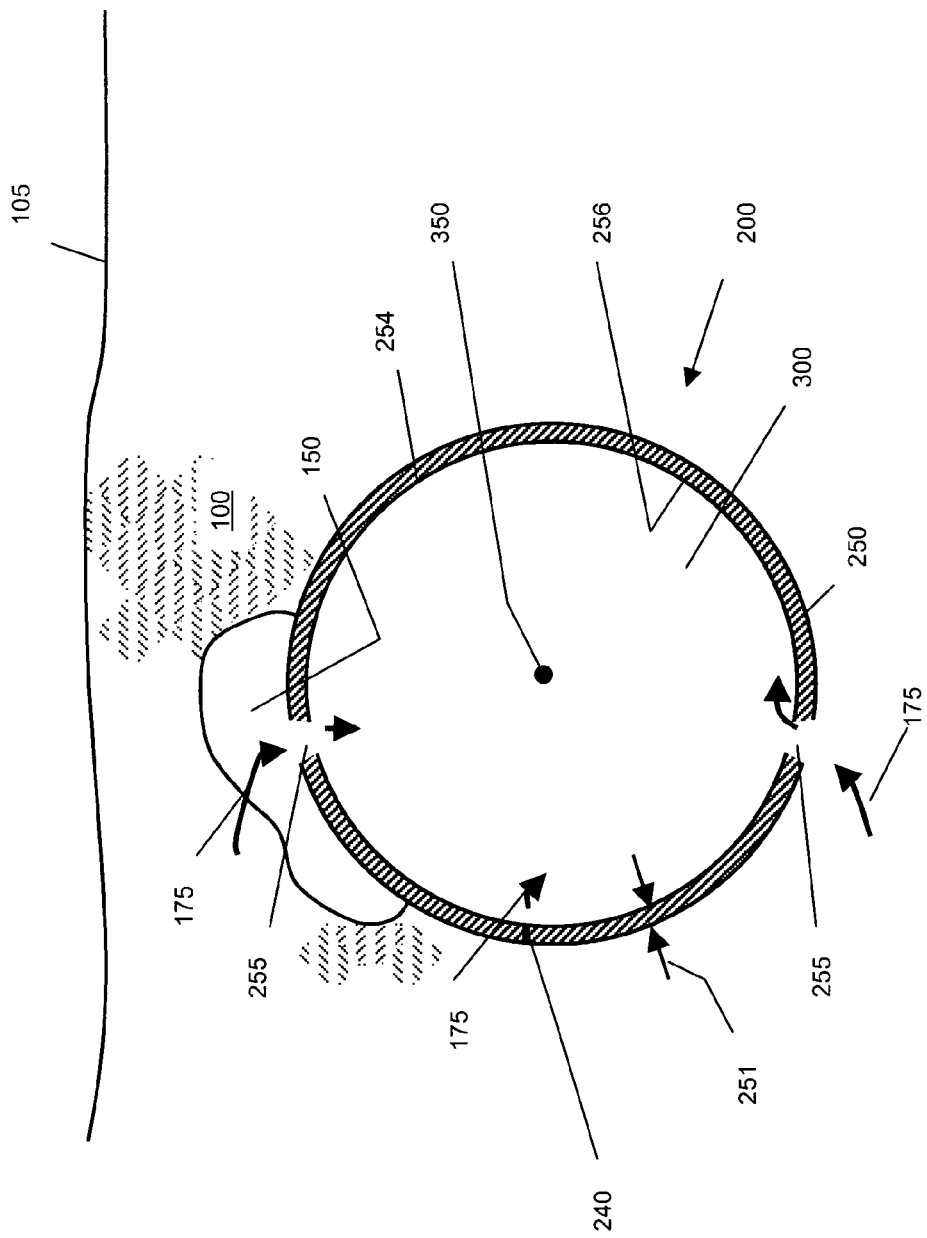
FIG. 2A represents a cross sectional view of a defective pipe.

FIG. 2A is a schematic illustration across the longitudinal axis 350 of a section of the damaged sewer pipe 200 beneath the ground surface 105 and adjacent void 150 in surrounding soil 100. Also illustrated are the pipe diameter 300 and cracks 240 and voids 255 through the thickness 251 of the pipe wall 250. The several vector arrows 175 illustrate the flow of ground water from the soil 100 into the void 150 surrounding the pipe 200 and through the cracks 240 and holes 255 within the sewer pipe wall 250. It will be appreciated that the voids intended to be remedied by the subject invention need not be of the large size depicted in these illustrations. Further, it will be appreciated that the subject invention is not limited to repair holes or cracks in pipes, but can be used to seal connections (or "couplings") between pipe segments, or between pipe lines, e.g., a sewer collection pipe and one or more lateral pipes convey waste ("sewerage") from individual residences, etc.

Use of close cell expandable foams have been used to fill subsurface voids in soils, including use to mechanically raise objects supported by the soil. This has been used in foundation leveling, etc., as taught by U.S. Pat. Nos. 4,567, 708, 6,521,673 and 6,634,831. However, this technology has important limitations for use in filing voids surrounding sewer pipes or sealing/repairing pipe defects. One disadvantage is the infiltration of the closed cell foam into the interior pipe diameter (through which sewerage is intended to flow), thereby creating an occlusion that must be mechanically removed to prevent blockage of the sewage flow. In addition, the expansive pressure of the closed cell foam (useful in filling or compacting the soil particles or interstitial voids within the soil or between the underground soil and the structure, e.g., sewer pipe or lateral collector, to minimize water collection/infiltration), may also further damage the pipe wall.

Figure 3A:
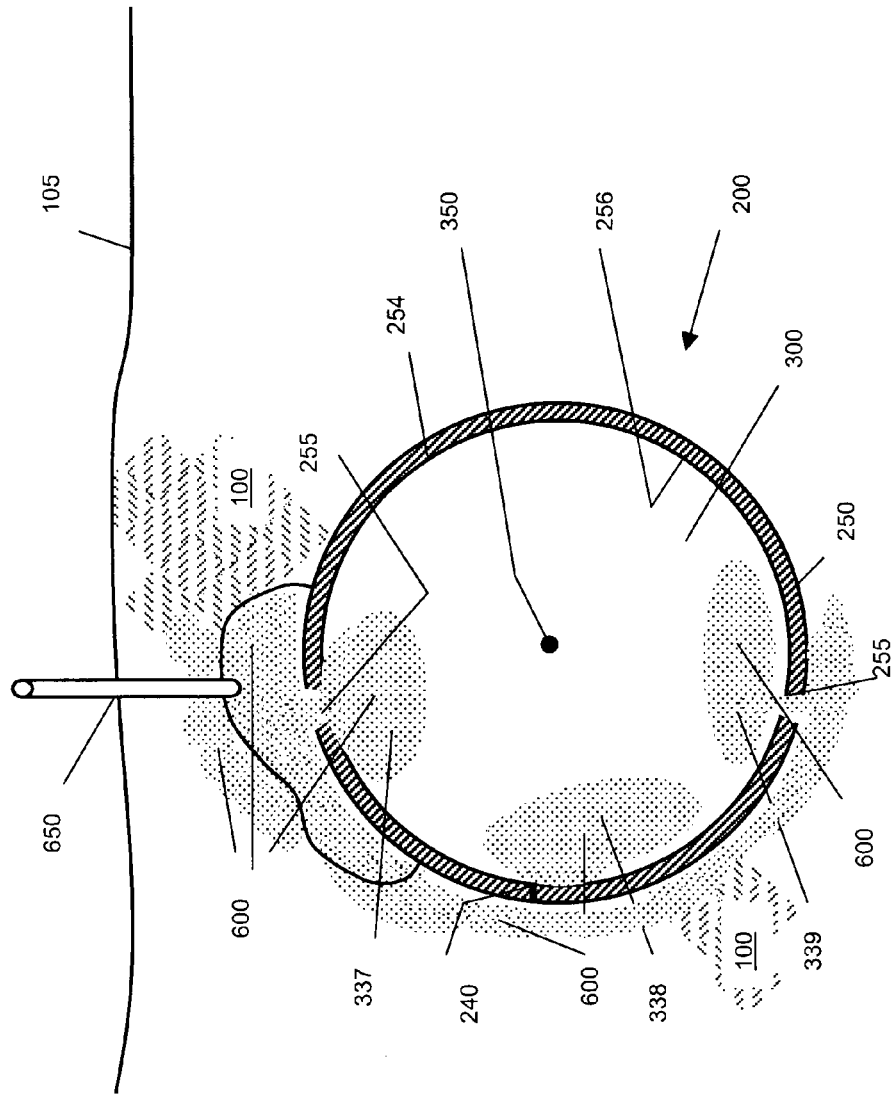
FIG. 3A illustrates the prior art use of foaming liquids.

FIG. 3A is a schematic illustration across the longitudinal axis 350 wherein closed cell foam 600 is injected from the ground surface 105 through the injection mechanism 650 into the void 150 within the ground 100 adjacent to damaged sewer pipe wall 250. The foam equipment combines static head mixers 650 with a strong insertion device attached to pumps (not shown) located at the ground surface 105. The cross section view illustrates the closed cell foam filling the void 150 and infiltrating into the diameter 300 of the sewer pipe 200 through the holes 255 and cracks 240 within the pipe wall 250. The infiltrating foam is shown to create obstructions 337 338 339 within the pipe diameter 300. It will be appreciated that the foam may not fill the entire void 150, perhaps due to the presence of entrapped ground water (not shown), thereby allowing for the continued collection of ground water proximate to the repaired pipe. The migration of foam into the pipe can ultimately block the pipe diameter 300 unless a cutter/grinder unit (not shown) is inserted into the pipe and the occlusion is removed. It will be appreciated that it is desirable to avoid this time consuming and expensive step.

Figure 9:
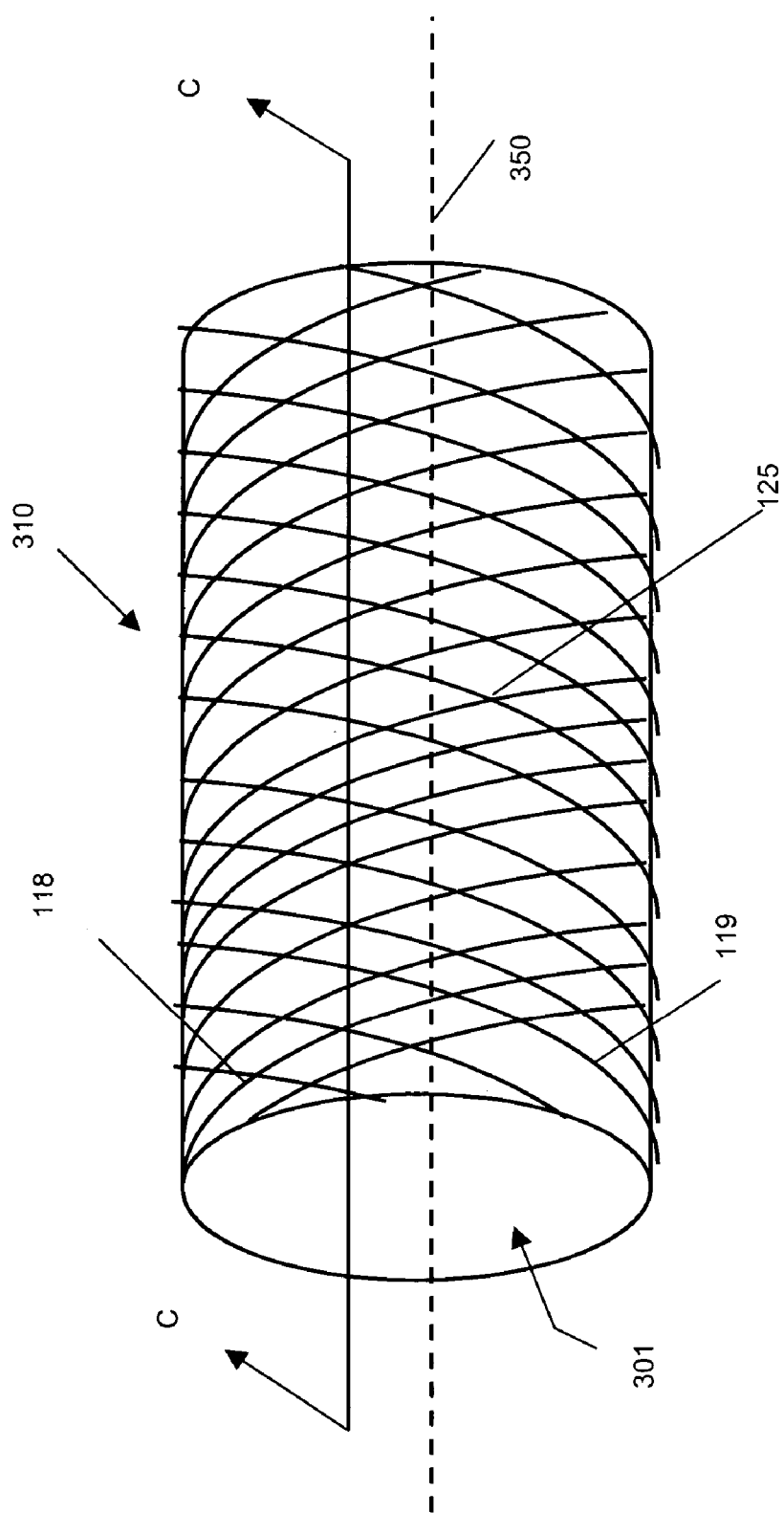
FIG. 9 illustrates a woven repair material utilized in one embodiment of the invention.

One embodiment of the apparatus and methods taught in this specification is the advantageous use of techniques for installing a pipe repair material (thermoset or thermoplastic impregnated liner) within the interior diameter of a sewer pipe in combination with injection of expanding closed cell foam proximate to the outer diameter of the sewer pipe. The repair material for the interior pipe diameter may be of a variety of structures, including a structure being defined as an arrangement of fibers such that the repair material has similar dimensions as the pipe diameter or pipe interface to be repaired or sealed. The arrangement of fibers further allows the repair material to be flexible and seamless. FIG. 9 illustrates an example of a woven structure 410 having a longitudinal axis 350. In the illustration, fibers 118 119 intersecting at a variable angle 125. It will be appreciated that the composition of fibers and fiber architecture can be varied, as shown in the cross sectional illustrations along the axis AA in FIGS. 10, 10A, 11A and 11B discussed later. In a preferred embodiment utilizing the repair material, the material includes a resin having a viscosity. An additive may be provided to alter the resin viscosity. It will be appreciated that it may be advantageous to increase resin viscosity to retard resin redistribution within the fiber repair material or fiber liner prior to and during the installation process.

A flexible and inflatable bladder is inserted within the pipe diameter. The bladder serves as a mold to press and hold the repair material to the interior surface of the pipe during the repair process. The inflated bladder, which, in an alternate embodiment of the invention, can be used without the resin impregnated repair material or liner, also minimize the migration of the chemical reactant or resulting foam injected into the underground soils proximate to the pipe. The migration of chemical reactants or foam can result in occlusion or obstruction of the pipe diameter. This would obviously hinder the flow of sewerage through the pipe.

The fibrous construction of the repair material, or the components of the inflatable bladder, can include conductive fibers, e.g., carbon fibers, that can be connected to an electrical power source. These conductive fibers, when powered with electric current, may provide electrically resistive heating directly through or immediately proximate to the thermosetting resin contained in the repair material. The combined and concurrent pressing of the resin impregnated fibers to the inner pipe wall surface with the heating of the thermosetting resin allows an improved repair and support. The addition of heat, in contrast to ambient conditions, allows more rapid curing. Further, this allows the bladder to remain in place as a mold pressing the repair material for a greater portion of the cure and minimizes the degradation of the repair by resin redistribution. It will be appreciated that the use of the expanding and heatable bladder also minimizes the formation of "annulae" between the interior pipe wall surface and the liner.

Further, heat from the bladder or repair material is also available to radiate through the thickness of the pipe wall to facilitate to the cure of the foaming liquid exterior to the pipe wall. Curing of the foam creates a phase change in the foam to a closed cell solid. The closed cell foamed solid can compact the underground proximate to the pipe, decrease voids or interstitial space containing infiltrating ground water, as well as support and seal the pipe and pipe junctions.

The availability of the proximate heat source also allows use of alternate foaming agents, particularly agents not containing isocyanates. It will be appreciated that isocyanates are considered to be a source of environmental contamination. These alternate reactants include hybrid polyurethane or polyester/polyurethane blend resin, and epoxy resins combined with diluents, catalysts, blowing agents and surfactants, an acrylimide, and cementitous slurry.

Figure 4A:
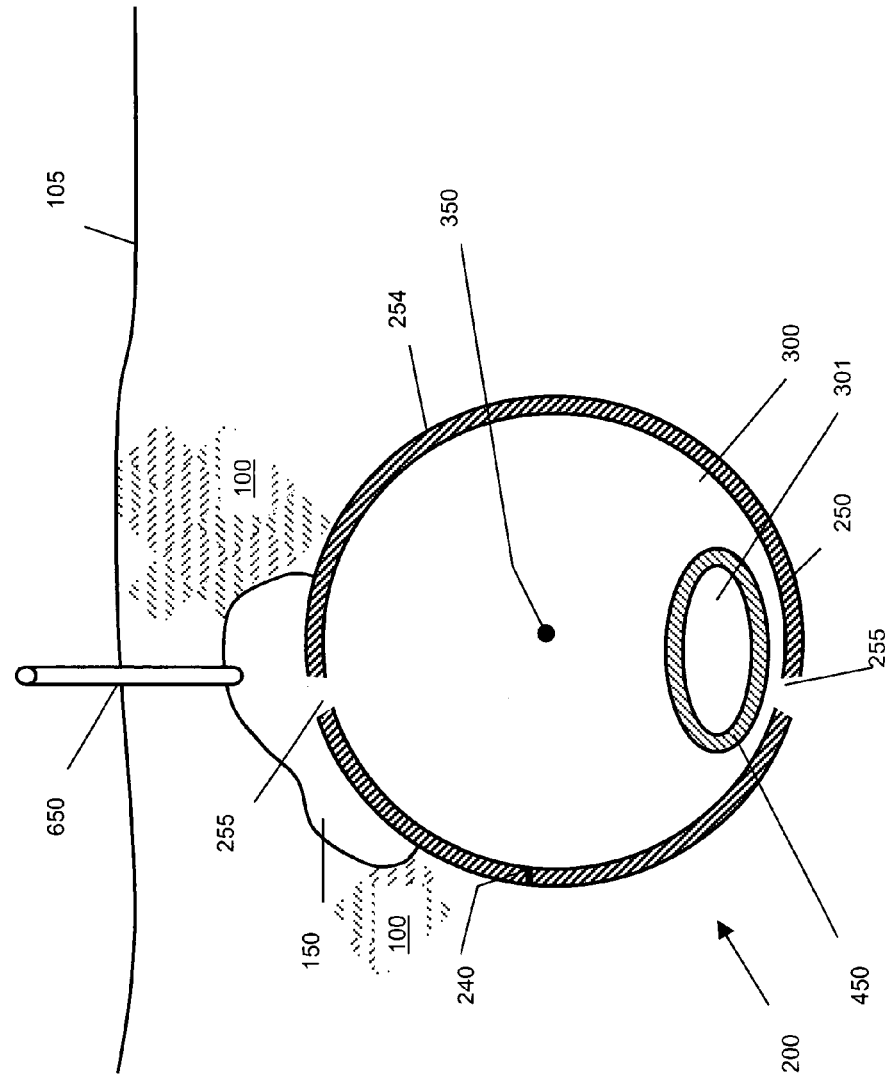
FIGS. 4A and 4B illustrate the use of the inflatable bladder in combination with injection of foaming liquid.

FIG. 4A is a schematic cross sectional illustration along the longitudinal axis 350 illustrating an embodiment of the method and apparatus of the invention by placing a flexible and inflatable heating bladder 450 inside the pipe diameter 300. The bladder is placed in the area of the pipe having holes 255 or cracks 240 in the pipe wall 250. In this manner, the inflated bladder can provide support to the damaged pipe and facilitate maintaining the pipe diameter 300 during the repair process. The bladder may have resistively heatable sub-components to facilitate the curing of the chemical reactant injected proximate to the exterior pipe wall surface 254.

Figure 4B:
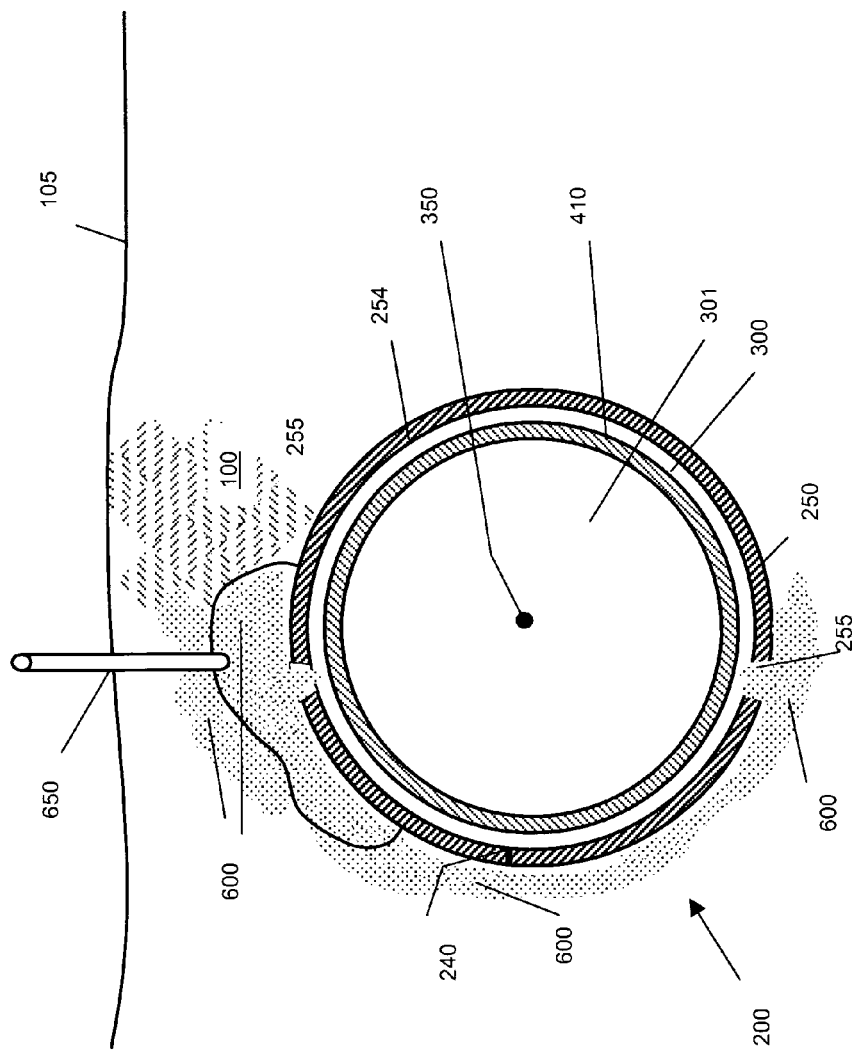

FIG. 4B is a schematic illustration across the longitudinal axis 350 of the pipe after inflation of the bladder 450. The bladder, if used as a heat source, may assist in the curing of the closed cell foam. It will restrain the injectible chemical reactant and resulting foam 600 from permeating the pipe through coupling connectors (211 210 of FIG. 2) or cracks 240 or holes 255 in the pipe wall 250. The migration of foam is illustrated in FIG. 3A by the multiple vector arrows. The liner 410 (not shown) may be placed over the bladder for reinforcement or to minimize binding of the bladder to the cured foam.

An embodiment of the invention includes the use of resistive energy as a source of heat for curing the injected chemical reactant, as well as to block the migration into the pipe diameter. This heat curing can be accomplished in combination with the placement of a resin impregnated ("prepreg") repair material within the pipe diameter. As mentioned above, the repair material or the flexible bladder may contain electrically conductive fibers. Alternatively, the fiber can be a combination of electrically conductive fibers and non-conductive fibers, which include polyester, glass, aramid, and quartz fibers, and thermoplastic fibers such as, but not limited to polypropylene, nylon and polyethylene.

The repair process is illustrated in FIGS. 4A, 4B and FIGS. 17A–G where one skilled in the respective arts observes that there are similarities in both systems, which require 50 K.W. generators and 150 CFM compressors and various cables and hoses. The present invention demonstrates the synergies between the two systems, which eliminates boiler trucks, and on site mixing and impregnation of repair material.

This invention addresses the cause and repair of connection offsets or misalignment of pipes and conduits. The misalignment of an originally installed linear pipe may result from faulty bedding surrounding the pipe, which is not tested as it is in pressure pipe/conduit situations, and ultimately can crack or offset the joints after the pipeline is back-filled. Another cause of misalignment is the result of the movement of ground water as already discussed. While some may contend this method is redundant and more costly, one skilled in the art will easily recognize the efficiencies and safety elements of the present invention This embodiment of the invention provides methods of repairing the misalignment of pipe sections 250A such as that shown in FIG. 14A. In this case, the non-linear conduit is buried below the ground surface 105 predominantly in a horizontal orientation as part of a pipe network, e.g., sewer system. The non-linear pipe consists of separate pipe or conduit segments 25A, 25B, 25C, 25D, 25E, 25F, 25G that have moved from the original longitudinal axis 350 illustrated in FIG. 14 to a non congruous longitudinal orientation 351 and thus does not follow a strictly linear path.

The embodiment of the method taught by this invention comprises providing the inflatable bladder dimensioned to fit within the interior diameter 300 of the pipe 250A, and particularly each non-congruous pipe segment 25A, 25B, 25C, 25D, 25E, 25F, 25G. The bladder is dimensioned so as, when inflated, presses against the interior surface of each damaged, e.g. mis-aligned, cracked or broken, section of conduit. The bladder can be made of any strong flexible material. It will be appreciated that it may be advantageous to fit the bladder with one or more layers of protective outer sleeves or liners ("liners"). The liners can provide a repair material (sometime referred to as "material structure") as discussed elsewhere herein, but may also provide protection to the bladder from sharp or jagged surfaces within the conduit sections. The bladder may be filled/inflated with fluid, such as water or air, and the effectiveness of the bladder would be compromised if the bladder was punctured.

FIGS. 15 and 15A illustrate an embodiment of the invention wherein the bladder 450 is placed within the diameter 300 of several mis-aligned pipe segments 25A, 25B, 25C, 25D, 25E, 25F, 25G beneath the ground surface 105. FIG. 15 illustrates the bladder with several pipe segments 25B 25E removed for clarity of illustration. The original or intended longitudinal axis of orientation 350 is also shown. It will be appreciated that the mis-alignment may be in any of the three axes of orientation (X, Y, Z).

FIG. 16 illustrates the next step of the repair method. Multiple chemical reactant insertion ports 650 are installed from the ground surface 105 to a desired location proximate to the pipe. In the illustrated situation, the ports are installed to be beneath the mis-aligned pipe segments 25B, 25C, 25D, 25E, 25F. The goal of the repair is to push the pipe segments into closer alignment with the longitudinal axis 350. A chemical reactant is injected through the ports into the ground 100 creating the expanding foam 600. FIG. 16A illustrates the result of the injection of expanding thermosetting foam 600, causing pipe segments 25B, 25C, 25D, 25E, 25F to be pushed upward as shown by vector arrow 675. The inflatable bladder 450 acts as a flexible mold having a control or guiding function in the realignment of the pipe sections, particularly with regard to the continuity of the pipe diameter 300 and common longitudinal axis of orientation 350.

As suggested by the FIGS. 14 through 16A, substantial length of pipe can be simultaneously repaired by the invention. The length of inflatable and heatable bladder is not limited. Lengths of pipe extending from one access manhole to a second manhole may easily be simultaneously repaired by a single use of the method and apparatus of the invention.

Based upon the foregoing disclosure, it will be readily appreciated that the above method can be combined with the embodiment utilizing a repair material liner impregnated or containing a curing thermosetting or thermoplastic material to seal the pipe from the interior diameter. The repair material structure may be defined by a plurality of fibers such that the repair material is flexible and seamless. This structure is sometimes referred to as a woven "preform".

Thee resin may be in the form of prepreg fibers or as a resin matrix surrounding the woven structure. The resin can be a polyester resin, a vinylester resin, a urethane polyester resin, a urethane-vinylester resin, an epoxy resin of a polyurethane resin. The resin is introduced into the repair material by either injection of infusion depending on the type of resin utilized.

A flexible and seamless repair material is able to adapt and conform to of the interior repair material will neither bind nor wrinkle to cause obstructions to material flow in the conduit. The construction and selection of the repair material also allows it to be used in conjunction with the inflatable bladder. The repair material may be placed as an outer liner on the deflated bladder.

Next, the repair material and bladder is placed in the conduit in close proximity to a damaged portion of the conduit. As the bladder is inflated, the repair material is pressed against the inner surface of the conduit wall. Finally, the resin is cured. Curing can be achieved in a number of ways, including but not limited in using hot water, steam, resistive heating, or infrared and ultraviolet radiation.

Figure 12:
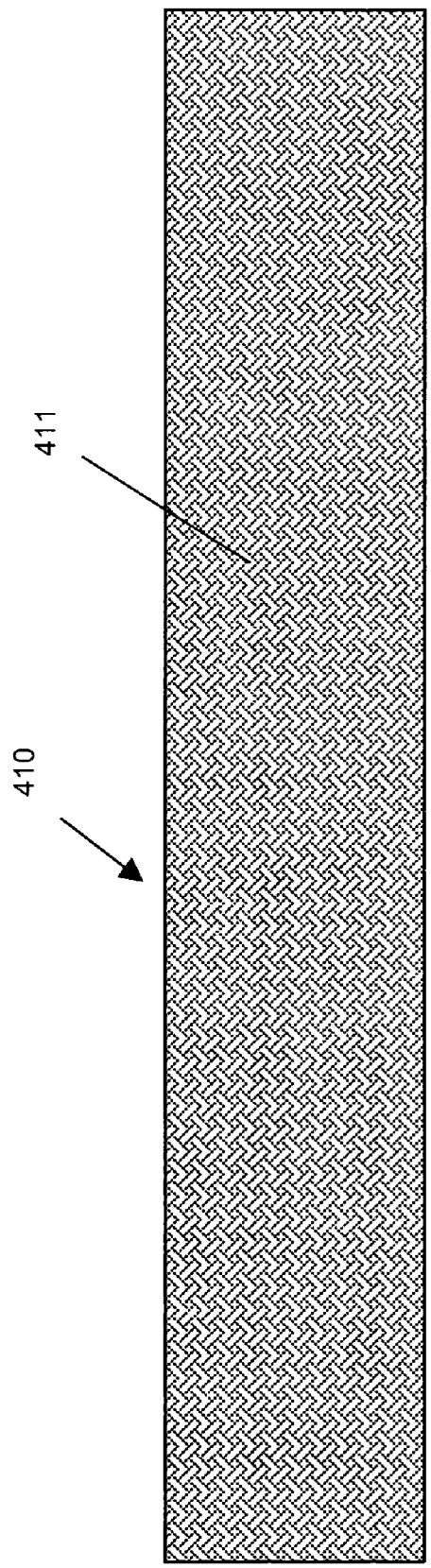
FIG. 12 is an illustration of the braided repair material.
Figure 13:
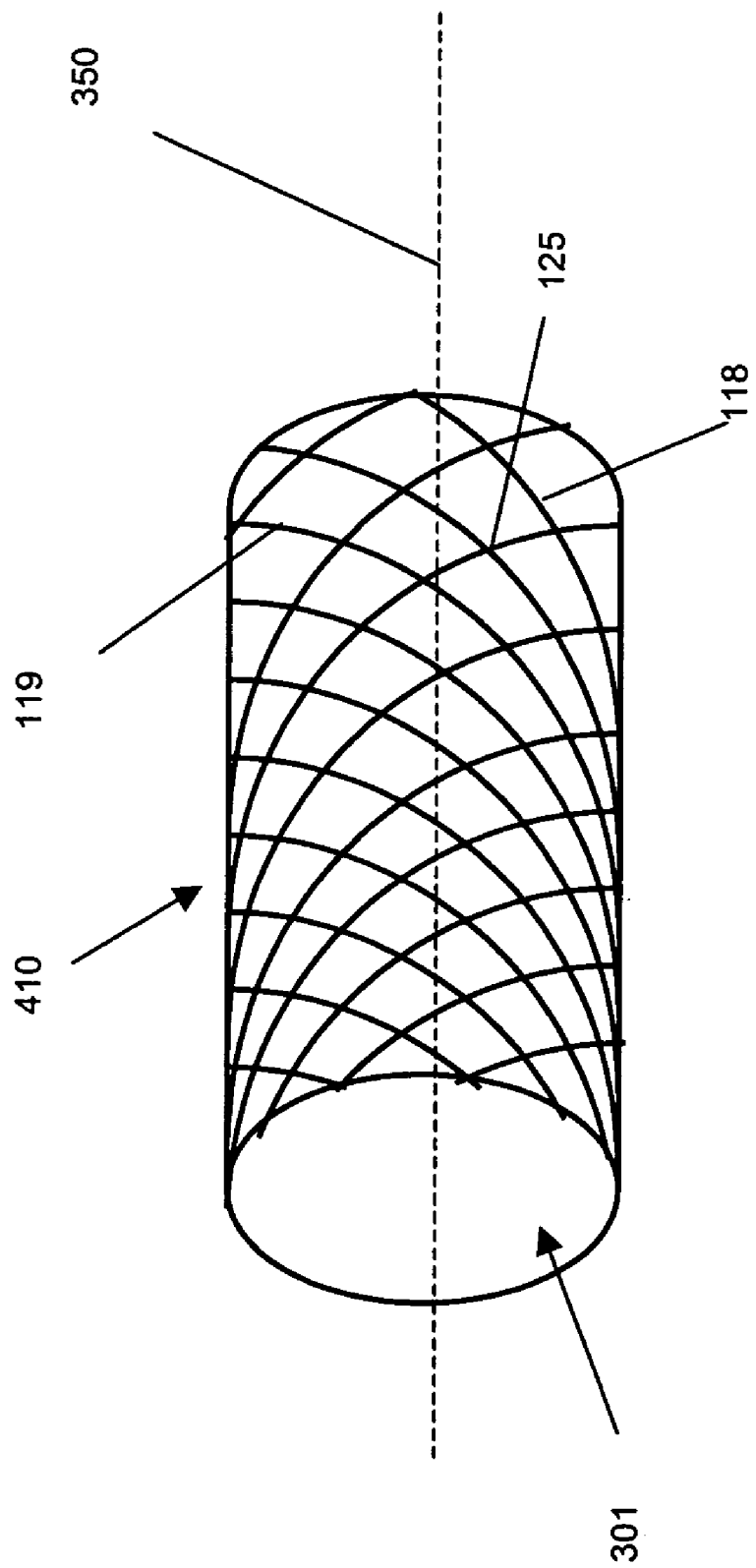
FIG. 13 is an illustration of the helically wound repair material.

Preferably the material structure 410 is substantially cylindrical (as shown in FIGS. 9 and 13) to facilitate conformity with the non-linear conduit. The cylindrical structure has an interior diameter 301 oriented about a longitudinal axis 350. However, the material structure is flexible and can be formed by braiding the fibers. A repair material 410 having a braided configuration of fibers 411 is shown in FIG. 12. In braiding most, if not all, of the fibers 118 119 are arranged in a helical pattern (as shown in FIG. 13). However, triaxial braiding can be used to combine fibers at two different axial or helical angles with a non-helical, longitudinal fiber. Repair materials fabricated by braiding processes offer exceptional ability to conform to irregular conduit geometries. Because a braided repair material is formed with its reinforcing fibers positioned helically rather than perpendicularly to the longitudinal axis of the material structure, these fibers have the ability to change their braid angle 125, and conform simultaneously in both the inside radius and outside radius of a section of a non-linear conduit.

Depending on the desired mechanical properties the density of the fiber braid can be varied to pack more fibers into the tubular arrangement to provide an increase in strength. Conversely, if the structural requirements are minimal, the braid density can be adjusted to where the material present in a volumetric area can be reduced. The angle 125 at which the fibers intersect each other, otherwise known as the braid angle, can also be varied. When the braid angle is increased, the fibers are positioned closer to perpendicular or vertical and the hoop strength of the finished repair material increases. This is desirable for conduits that are required to support a great amount of weight or withstand high internal pressures. The varying mechanical fiber compaction can be used, e.g., knitting, weaving and braiding.

Use of braid or similar types of mechanical fiber compaction construction also will facilitate the unlimited lengths of pipe that may be simultaneously repaired.

FIGS. 10, 10A, 11A and 11B are cross sectional representations of the fiber layers of a repair material illustrated in FIGS. 9 and 13. Various reinforcing materials can be included in the braided construction to accommodate both performance and cost issues. FIG. 10 illustrates a combined placement of reinforcing fibers 122, e.g. glass or nylon, with fibers 124 constructed of thermoplastic material. These fibers can be one of a combination of various engineered thermoplastics. In addition, thermoplastic films 130 may be used. These fibers, films and reinforcing fibers can be consolidated using any of the aforementioned methods. FIG. 10A illustrates repair material 410 comprised of a combination of reinforcing fibers 122 impregnated within a matrix of resin 131. Various non-electrically fibers can be employed as reinforcement. The fiber construction can be varied as shown in FIG. 11A. The combination of fibers forms the material structure 410. Additionally FIG. 11A also shows a film 130 of thermoplastic material that forms part of the material structure 410.

Additionally, FIG. 11B illustrates that the material can include electrically conductive fibers 120, for example carbon fibers, in order to cure the resin and electric current can be caused to flow through the conductive fibers to resistively heat the repair material. The fibers can be a combination of electrically conductive fibers 120, thermoplastic fibers 124 and non-conductive fibers 122 e.g., polyester, glass, aramid, and quartz fibers. Other combinations and architectures will be apparent to persons skilled in the art.

When electrically conductive fibers are used in conjunction with the thermoplastic fibers and films, as illustrated in FIG. 11B, resistive heating can be generated. The heat causes the thermoplastic materials to melt and flow, permeating the electrically conductive fibers and other non-electrically conductive fibers. A reinforced thermoplastic composite results when the materials cool and harden. In this embodiment, the need for liquid thermosetting resin (which phase change solidification may be enhanced by the addition of heat) is eliminated offering unlimited shelf life and case of handling. Finished composite properties can be customized with the selection of an appropriate thermoplastic matrix and reinforcing fibers.

As shown in cross section in FIGS. 10 and 11A the repair material can contain fibers having both structural properties 122 and thermoplastic fibers 124. Alternatively separate bundles of electrically conductive fibers 120 can be co-mingled with bundles of thermoplastic fibers 124 and structural or reinforcing fibers 120 as shown in FIG. 11B. In both cases, the bundles may be braided together to form the repair material.

Figure 12A:
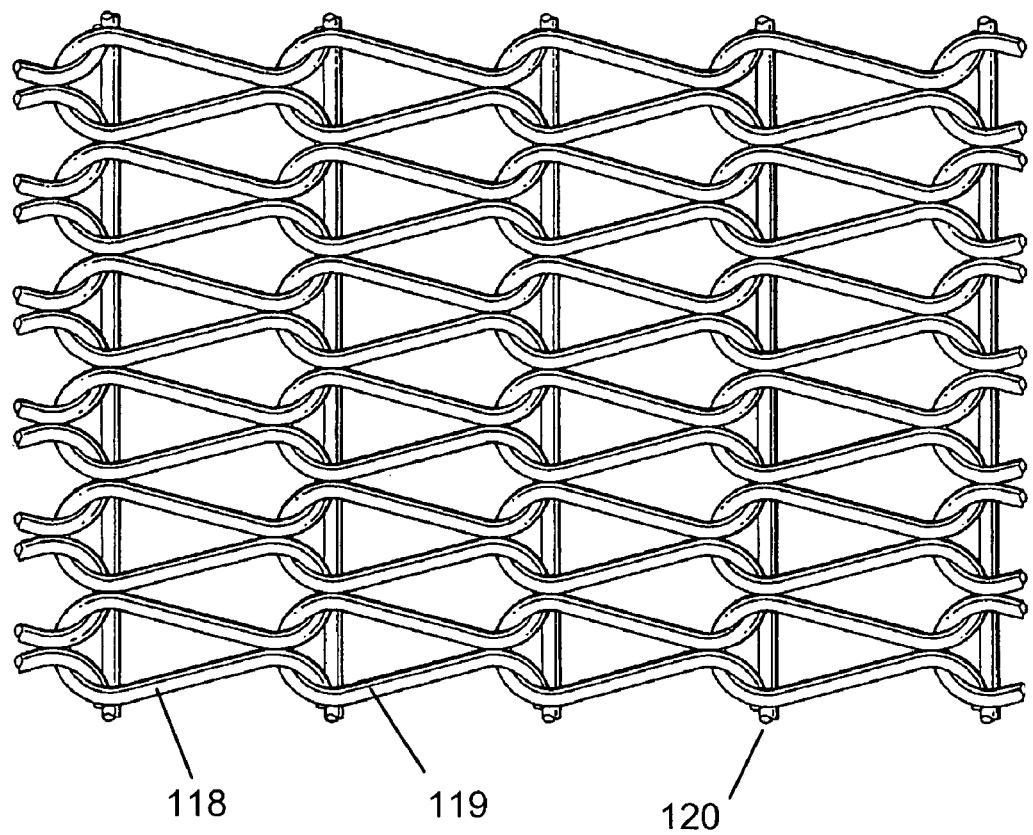
FIG. 12A is an illustration of a rochelle knit.

In another preferred embodiment, the electrically conductive fibers have an exterior layer or coating of electrically conductive fibers than are then braided. In another preferred embodiment, the seamless material structure is formed by knitting the fibers. In knitting, the repair material is produced by inter looping continuous chains of fibers in a circular fashion. An enlarged view of knitted fibers 118 119 120 is shown in FIG. 12A. In a rochelle knit, it is possible to introduce the fibers in a basically longitudinal direction. Because the fibers 118 119 are looped in a circular fashion at every stitch, the finished tubular structure is inherently flexible. For example, in one linear inch of fiber stitch, the actual fiber length may be as long as two inches. This allows continuity in the fibers throughout the length as well as allowing the fiber loops to stretch or open up to variances in the conduit geometry. Various reinforcing materials can also be included in the knit construction to accommodate both performance and cost issues. In addition, electrically conductive fibers 120 can be used such that resistive heating is feasible to cure the resin.

In another preferred embodiment, the seamless material structure is formed from a combination of two or more material layers. A first material layer is a seamless, cylindrical tube configured to fit within a second material layer that has a seamless, cylindrical tube configuration. The material layers are formed from an arrangement of fibers, preferably either braided or knitted fibers. The first material layer is nested within the second material layer and then stitch-bonded together with a stitching thread to form the materials structure. Preferably, the stitch-in thread is elastic to further ensure flexibility of the repair material. In addition, electrically conductive fibers can be used such that resisitive heating is feasible to cure the resin.

Stitch bonding is a method by which different materials can be consolidated into various forms including seamless, tubular products. The consolidating results from either continuous or intermittent stitching or sewing through the various layers materials. Reinforcing fibers can be used and aligned in a helical arrangement to a accommodate geometry changes much like a braided composite. Stitch bonding also allows the use of a wider variety of electrically conductive material formats such as non-woven graphite formed into tapes. These tapes would be introduced into the composite at a helical angle.

In another preferred embodiment, the seamless material structure is formed from a combination of two ore more material layers. A first material layer is a seamless, cylindrical tube configured to fit within a second material layer that also has a seamless, cylindrical tube configuration. The material layers are formed from an arrangement of fibers, preferably either braided or knitted fibers. The first material layer is nested within the second material layer and then needle punched with a needle board to form the material structure. The needle board has a plurality of needles such that the needles penetrate the first material layer. When needles are driven through the first material layer, varying amounts of fibers from the first material layer are pulled through the cross section of the adjacent second material layer. These fibers effectively bind the material layers together. In addition to consolidation, the fibers also provide reinforcement in the Z axis, defined as the axis corresponding to the material layer thickness. The characteristics of the repair material, including flexibility, can be altered by varying the force applied to the needle board, the type and number of needles used, and the number of needle penetrations per square inch. In addition electrically conductive fibers can be used such that resistive heating is feasible to cure the resin.

In another preferred embodiment, an additive adapted to increase the resin viscosity is provided. The additive is mixed with the resin to form a resin-additive mixture whereby the resin viscosity is increased after a period of time has elapsed. The additive should be formulated such that the resin viscosity does not immediately increase because this could preclude either resin introduction or resin permeation of the repair material. The resin additive adheres to the fibers in the first and second material layers. As a result, the resin additive mixture stabilizes the fibers and the material layers. In addition electrically conductive fibers can be used such that resistive heating is feasible to cure the resin.

Figure 17A:
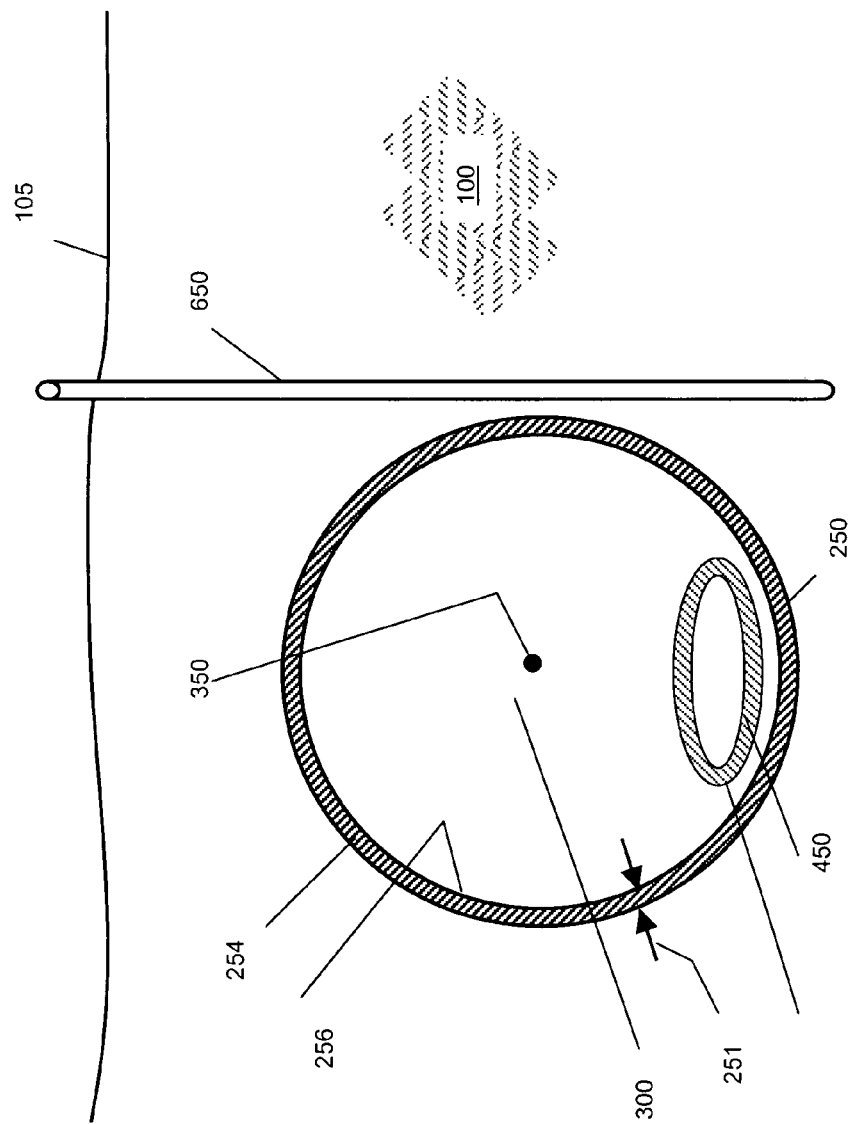

FIGS. 17A through 17G illustrate the sequential steps of the combined application of curing a foaming chemical reactant proximate to the exterior of underground 100 pipes, with placement of a curable liner on the interior pipe surface. FIG. 17A is a cross sectional view of a pipe 250 beneath the ground surface 105 and having an interior diameter 300. The pipe has a longitudinal axis of orientation 350. The pipe has an inner wall surface 256, an exterior wall surface 254 and a wall thickness 251. Also illustrated is an insertion port 650 for injecting expanding foam reactant at a selected location in relation to the buried pipe. Also shown is the deflated bladder 450 and separate material structure 410 positioned as an outer liner to the bladder.

Figure 17B:
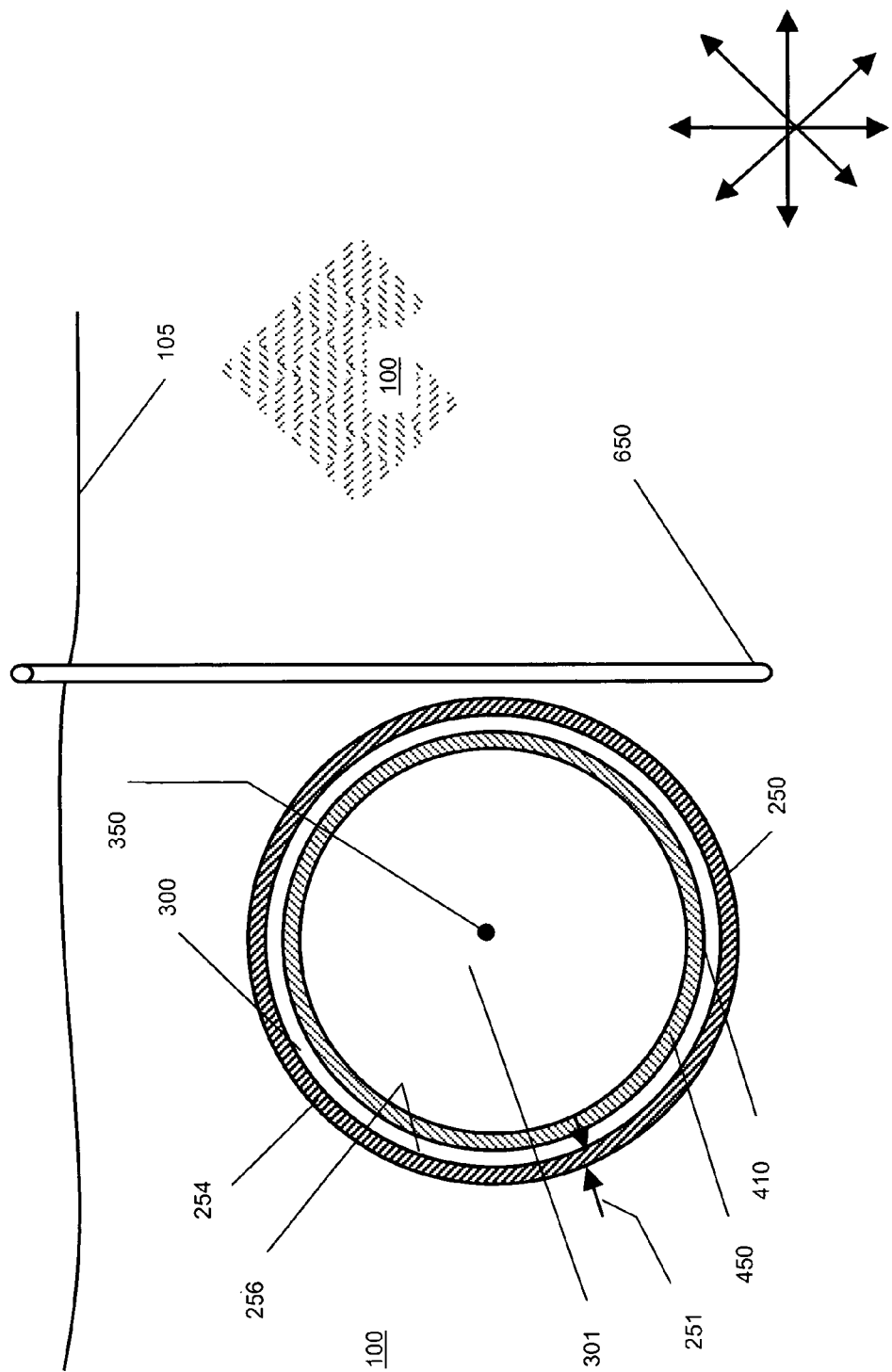

FIG. 17B illustrates the same components within the ground 100, but with the bladder 450 now inflated and placing the material structure/repair material 410 into near contact with the inner pipe surface 256. The diameter 301 of the material structure is shown. In this cross sectional view, only a small portion of the original pipe diameter 300 is not occupied by the inflated bladder and material structure.

It will be appreciated that the bladder 450 is to be inflated to press the structural material 410 into contact with the inner pipe wall 254 and the space shown in the following Figures is for clarity of illustration only.

Figure 17C:
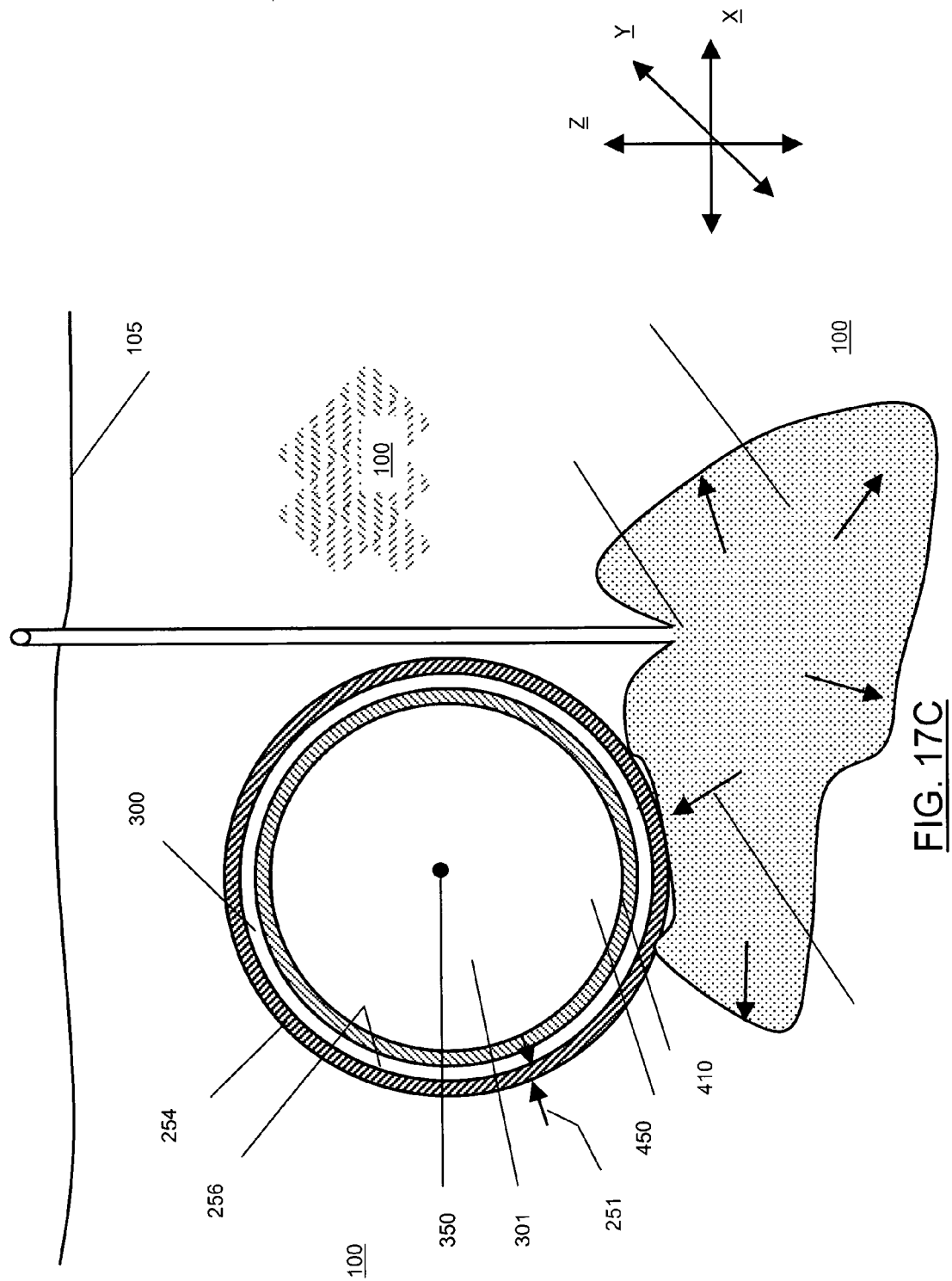
Figure 17D:
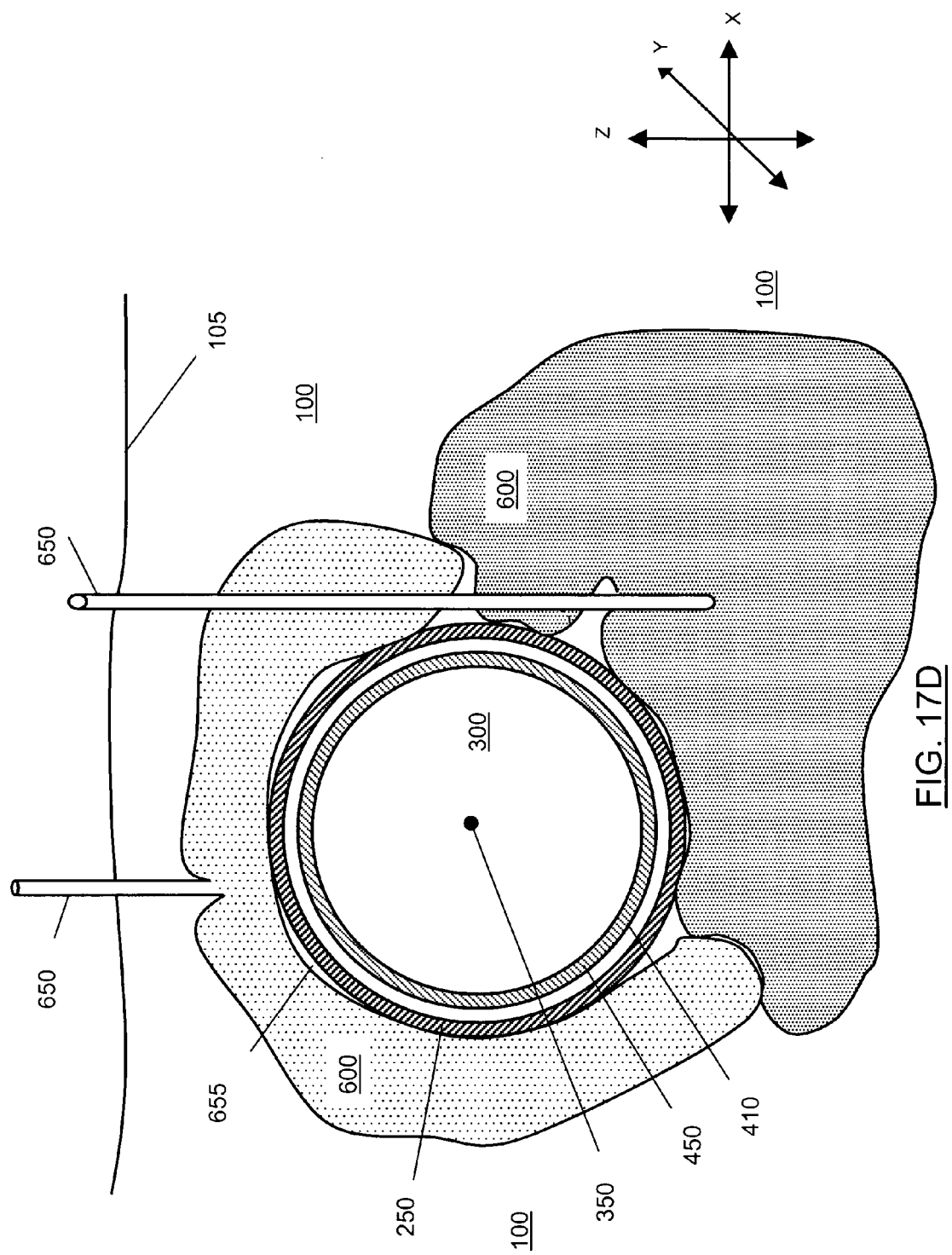

FIG. 17C illustrates the foaming chemical reactant 600 being injected into the ground 100. The foam variously expands in all directions, as illustrated by the several vector arrows, creating a force compacting the underground soil, driving away interstitial groundwater and pressing against the outer pipe wall 254 now reinforced by the inflated bladder 450. FIG. 17D illustrates this process with multiple injecting foams, causing the pipe to be substantially encased in the expanding foam 600, thereby compacting the ground, driving interstitial groundwater, minimizing or filling voids adjacent to the pipe and thereby stabilizing the pipe.

Figure 17E:
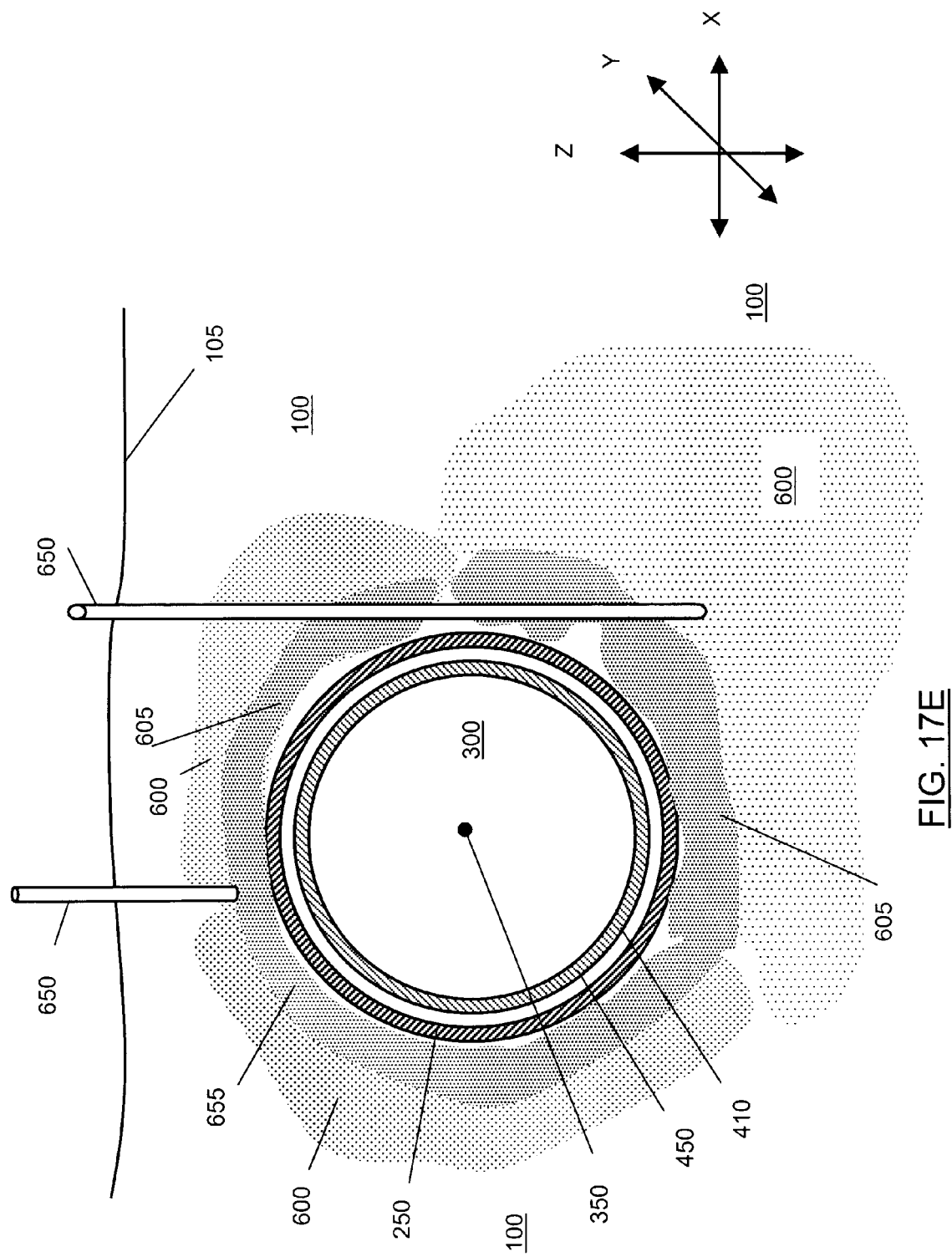

FIG. 17E illustrates the curing of the foam assisted by electrically resistive heat created from current within the electrically conductive fibers within the repair material 410. A portion of the radiating heat travels outward into the thickness of the pipe wall 251 and into the surrounding ground or foam. The distance or range of significant heat transfer 605 may be less than the area occupied by the foam 600. However, within this area 605, effective curing of the foam can be achieved, thereby effectively encapsulating the pipe wall, while simultaneously installing an interior reinforcing material (In another embodiment discussed previously herein, the conductive fibers can be contained within the bladder or a protective liner of the bladder separate from any repair material.)

Figure 17F:
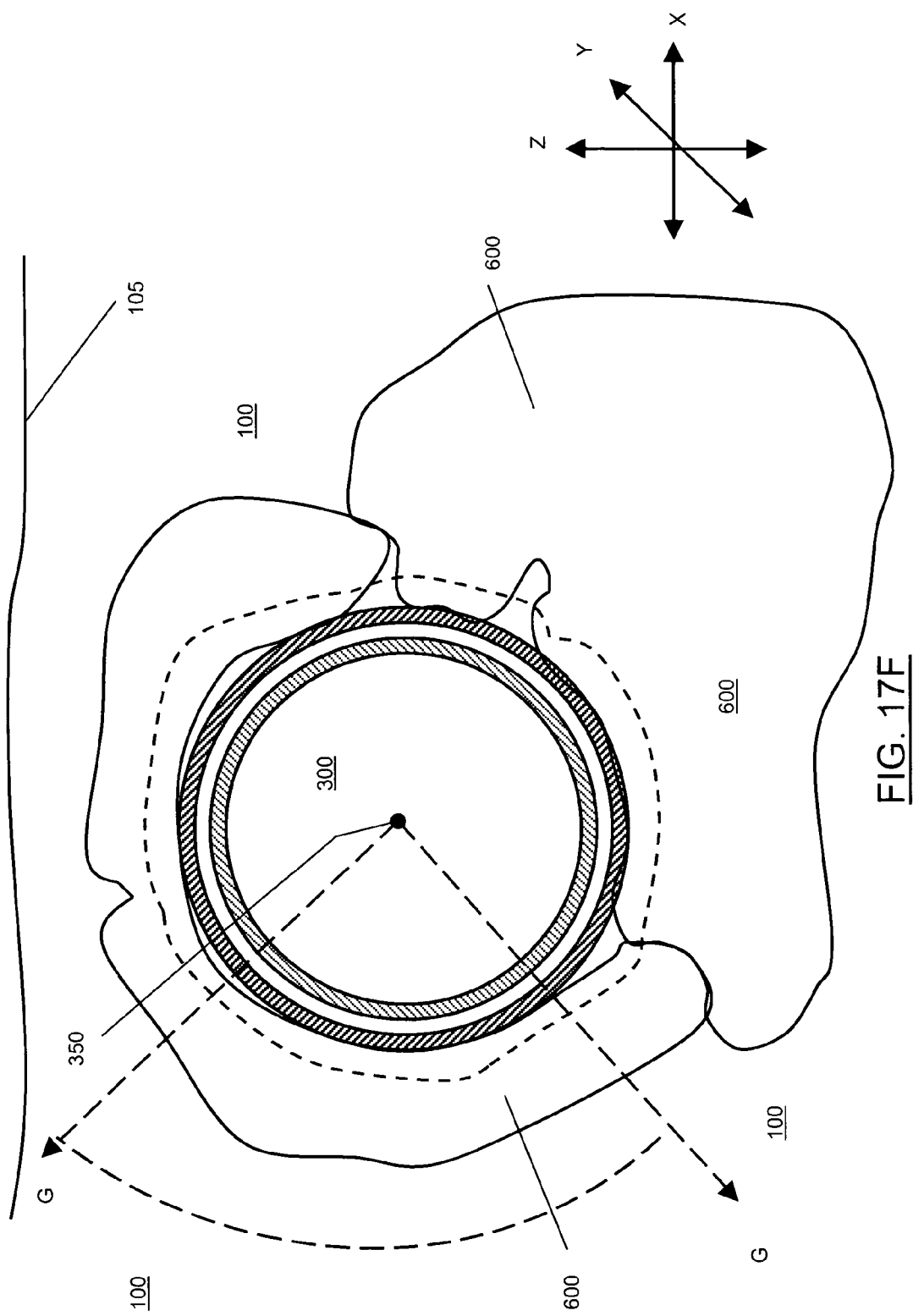

FIGS. 17F and 17G illustrate a cross sectional area of the invention, illustrating the interior diameter 301 of the repair material 410 containing the inflated bladder 450, the pipe thickness 251, the area 605 of foam cured by the radiant heat, the outer area of foam 600 and the surrounding ground 100.

Figure 5:
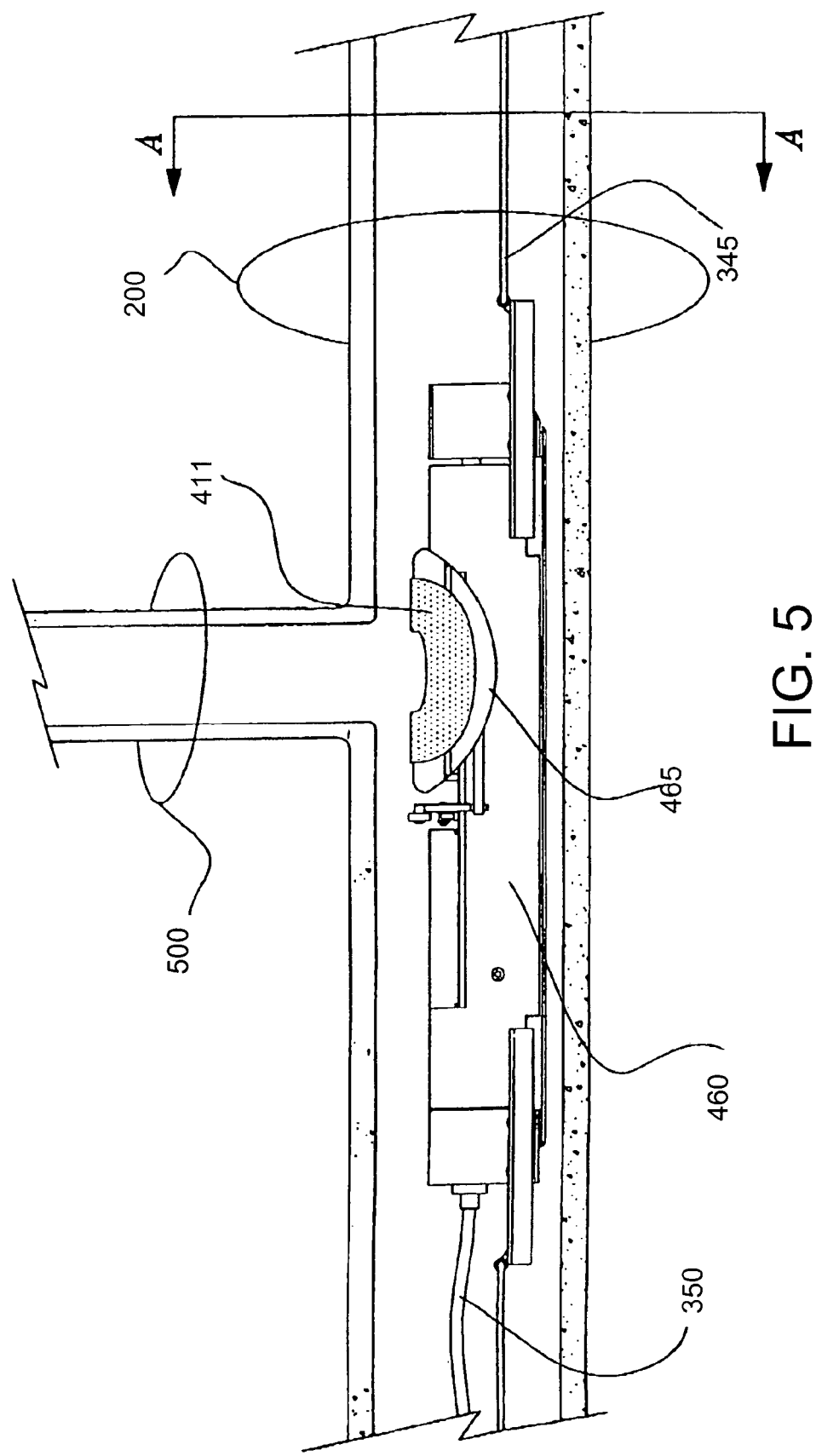
FIG. 5 illustrates the pipe repair equipment utilized with simultaneous repair of the pipe interior and ground stabilization.

The present invention also provides methods and apparatus for repairing a section of non-linear pipe such as the junction or interface 400 between two pipes 200 500 as illustrated in FIG. 1. A preferred embodiment of the apparatus of the present invention is depicted in FIG. 5. In accordance with the invention, the apparatus includes a main body 460 that is positioned in a first conduit 200. The first conduit 200 may be pipe forming a main line of a sewer system. The main line 200 intersects a second conduit or lateral line 500. Lateral line 500 is shown here in a perpendicular position essentially at a 90 angle to the main line pipe and intersects the main line pipe at the top portion. This condition is typical but may also be arranged in other configurations. For example, the lateral pipe may intersect the main line pipe at ±45 and can be located radially anywhere from the nine o'clock position to the 3 o'clock position.

Radial and vertical positioning of the apparatus is achieved remotely using appropriate controls, and communicated to the apparatus through an umbilical 350. The entire assembly 460 is delivered to the point of repair using a winch or similar device (not shown) attached to the unit via cable assemblies 345. Also illustrated are the heatable caul plates 465 and the flange portion of the repair material 411. (It will be appreciated after reading the following paragraphs that FIG. 5 illustrates the repair material in a loaded position within the main body 460 of the apparatus.

Figure 5A:
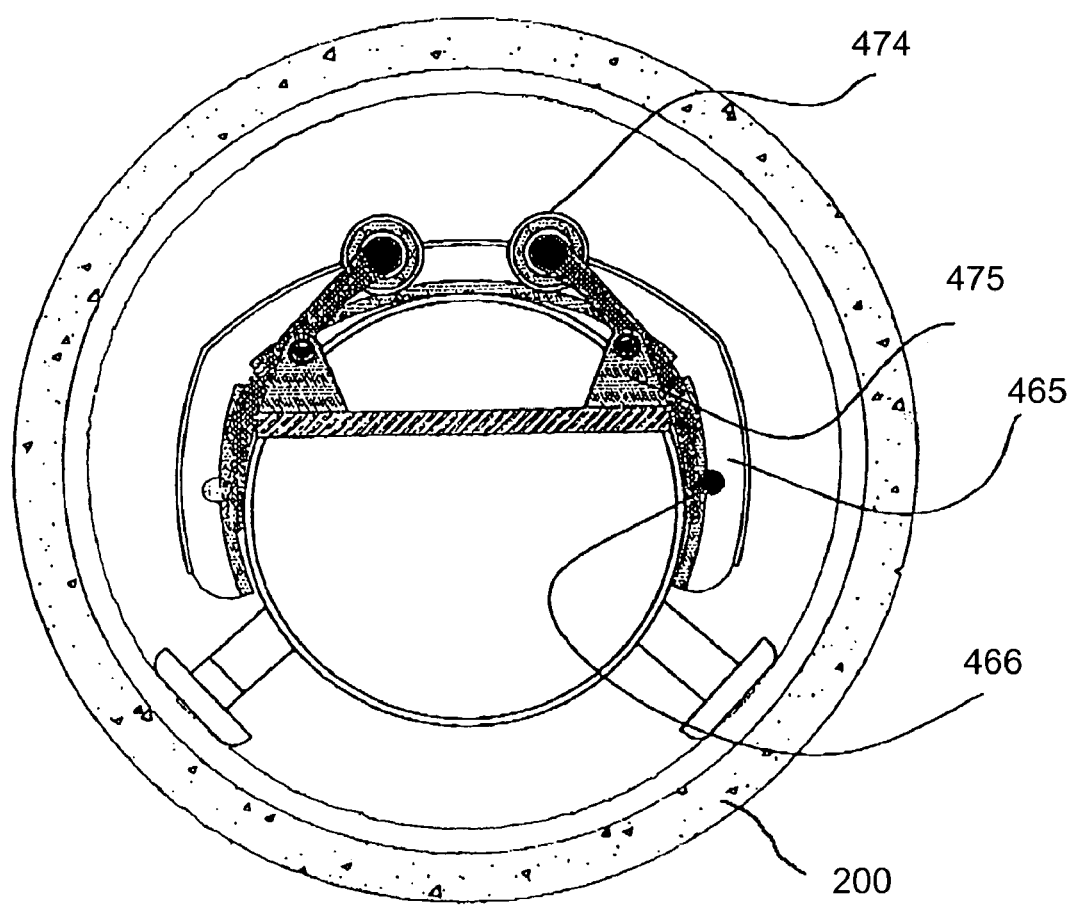
FIGS. 5A–5E further illustrate the pipe repair equipment.
Figure 5B:
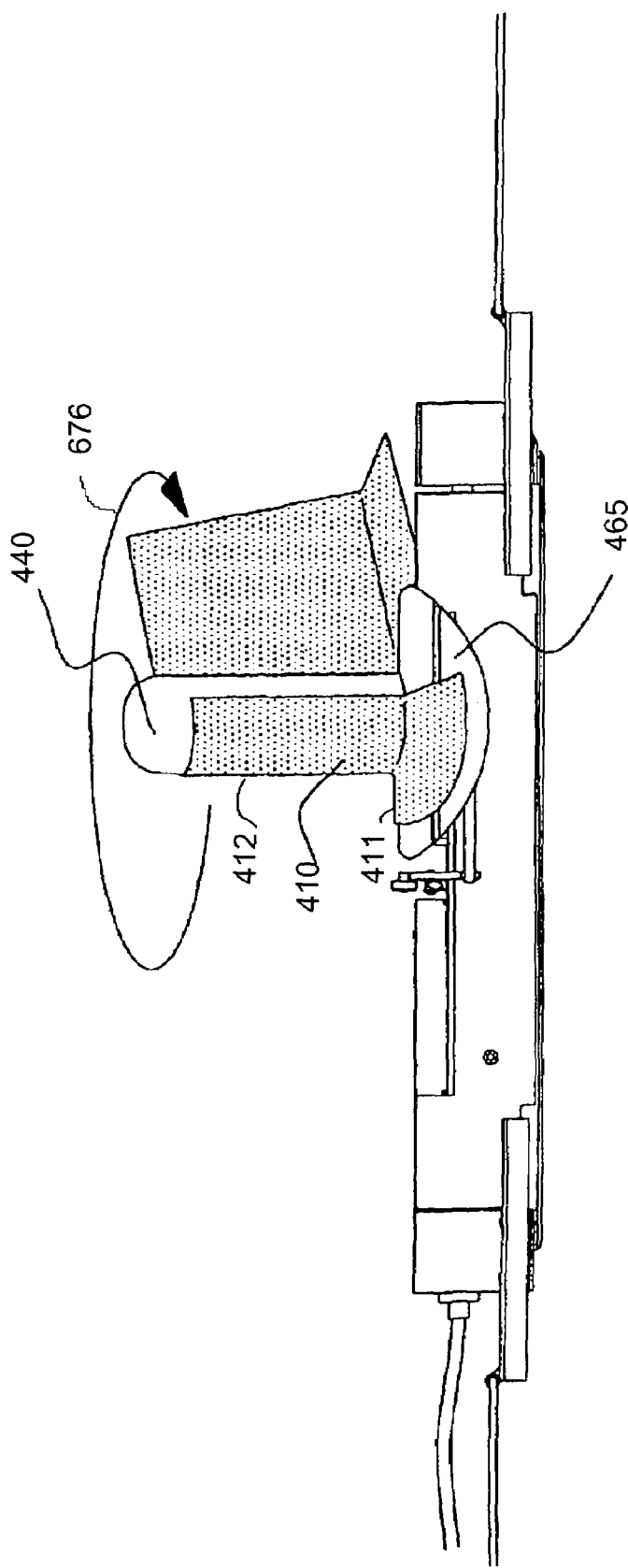

FIG. 5A provides a cross sectional view of the apparatus depicted in FIG. 5, showing the heatable caul plates 465 in a retracted position on an upper portion of the body 460 of the apparatus, thereby affording a minimal cross section and allowing passage into a main line that may contain offsets, protrusions, etc. The caul plates 465 (hereinafter referred to as "wings") are articulated to allow this reduced cross section by the use of hinges 466.

FIG. 5A illustrates the loading of the repair material 410 into the apparatus 460 in preparation for insertion at the intersection of the main line and lateral line. Repair material 410 is preferably constructed of a fibrous woven material capable of holding a heat hardenable or formable resin matrix. Material 410 is also constructed of a material that would be expected to include a portion 412 that conforms to the interior geometry of the lateral pipe wall, and be flexible enough to provide a flange face 411 in the main line pipe. (Reference is also made to FIG. 6C.) It is shown that the repair materials is wrapped around the retractable/inflatable bladder segment 440. In 5C, the method for loading the repair material 410 is also illustrated. Applying a fluid pressure to the body 460 through umbilical 350 pressurizes an inflation device in the form of a bladder 440. This fluid pressure is regulated through the use of electro-pneumatic regulators located in rear housing 461 in the body 460, and controlled remotely through signal wires in umbilical 350. Pressure sensing is accomplished by sending units located within main body and transmitted through umbilical. All of the signal wires in the umbilical terminate at an operator interface control station (not shown). The force required during this step in minimal and sufficient to cause the bladder 440 to rigidize.

Figure 5C:
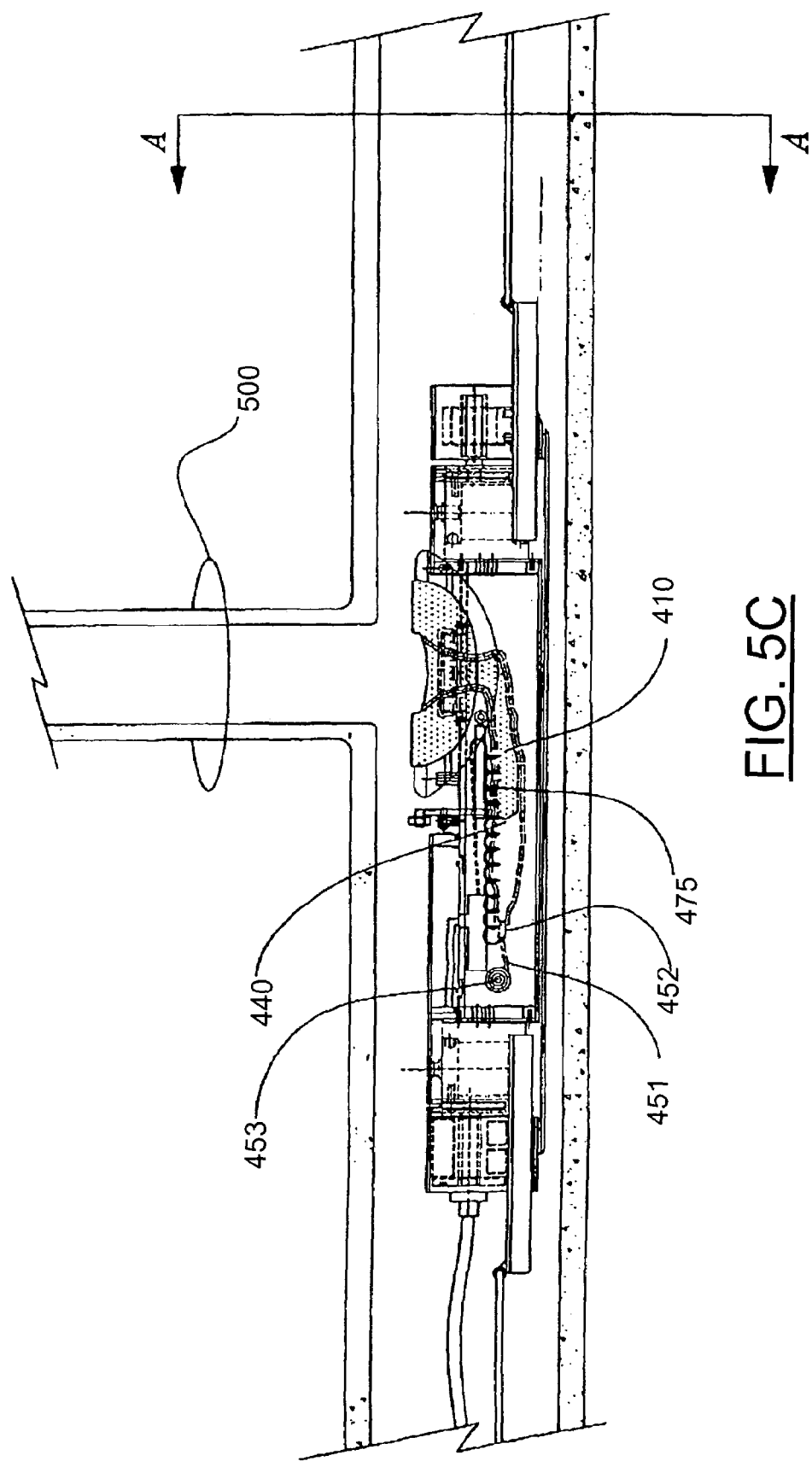

The repair material is constructed in such a fashion as to incorporate both the tubular lateral lining portion 412 as well as the flanged area 411 without the undesirable effect of a potentially weak seam at the transition from tubular to planar. With the bladder 440 pressurized, the material 410, which may be pre-impregnated with a resin as described elsewhere in this specification, is wrapped 412 around the extended bladder 440 as shown by the vector arrow 676 and caused to lay flat 411 on the surface of the wings 465. Depending on the structural requirements, layers of material can continue to be plied to achieve the desired strengths. With the lay-up complete, the pressure of the bladder 440 is lowered the material 410 can be inverted into the main body of the apparatus as shown in FIG. 5C. The main body contains a spindle 453 capable of rotation that is fixably attached within the body 460 at a posterior location. The spindle is sealed from the atmosphere to the use of o-rings and protrudes slightly from the body to allow attachment of a tool to cause rotation.

Figure 5D:
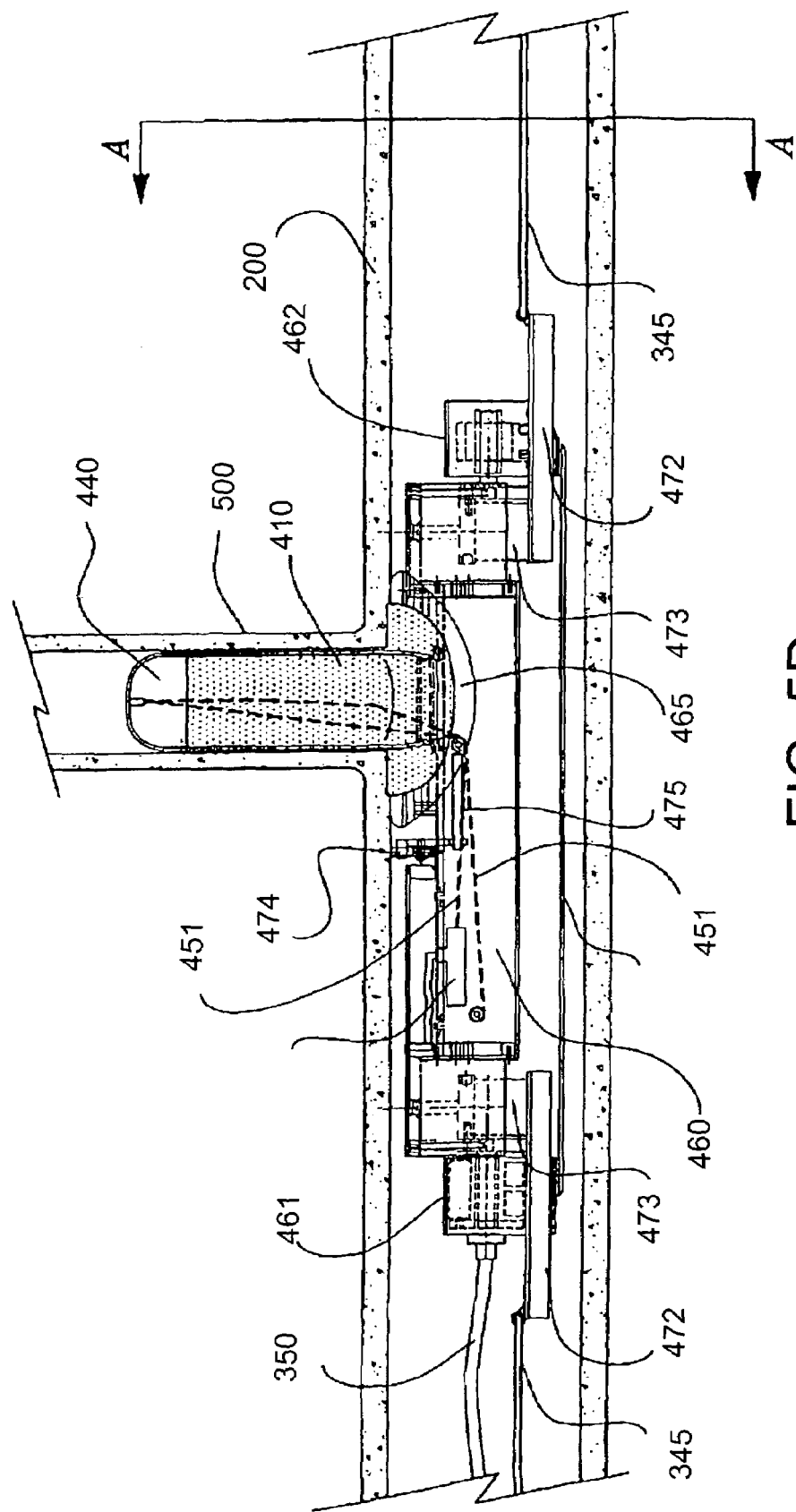

As shown in FIG. 5D, the bladder construction contains an internal tether 451 that is permanently attached to the interior of the bladder at fitting and removably attached to spindle 453 within the main body 460. To invert the bladder 440 and repair material 410 into the main body for safe transport to the repair location, the tether is wound about the spindle causing the bladder to retract. With the repair material loaded into the device, a winch, or similar device is employed to pull the apparatus to the desired location within the pipeline. A closed circuit television camera (not shown) can be used to assist in determining the correct location and positioning. Once the entire assembly has been satisfactorily located in proximity to the repair area, final positioning commences vial remote control.

FIG. 5D shows the internal working of the apparatus. In order to facilitate rotary position, the apparatus contains a powered rotation mechanism located in the rear housing 461. The rotational mechanism is attached to the main body by use of a coupling. The front section 462 of the body 460 contains a rotary bearing to compliment this action. Skids 472 are attached to both the front 462 and rear 461 sections to afford minimal surface contact with the main line pipe and ease pulling forces required.

Figure 5E:
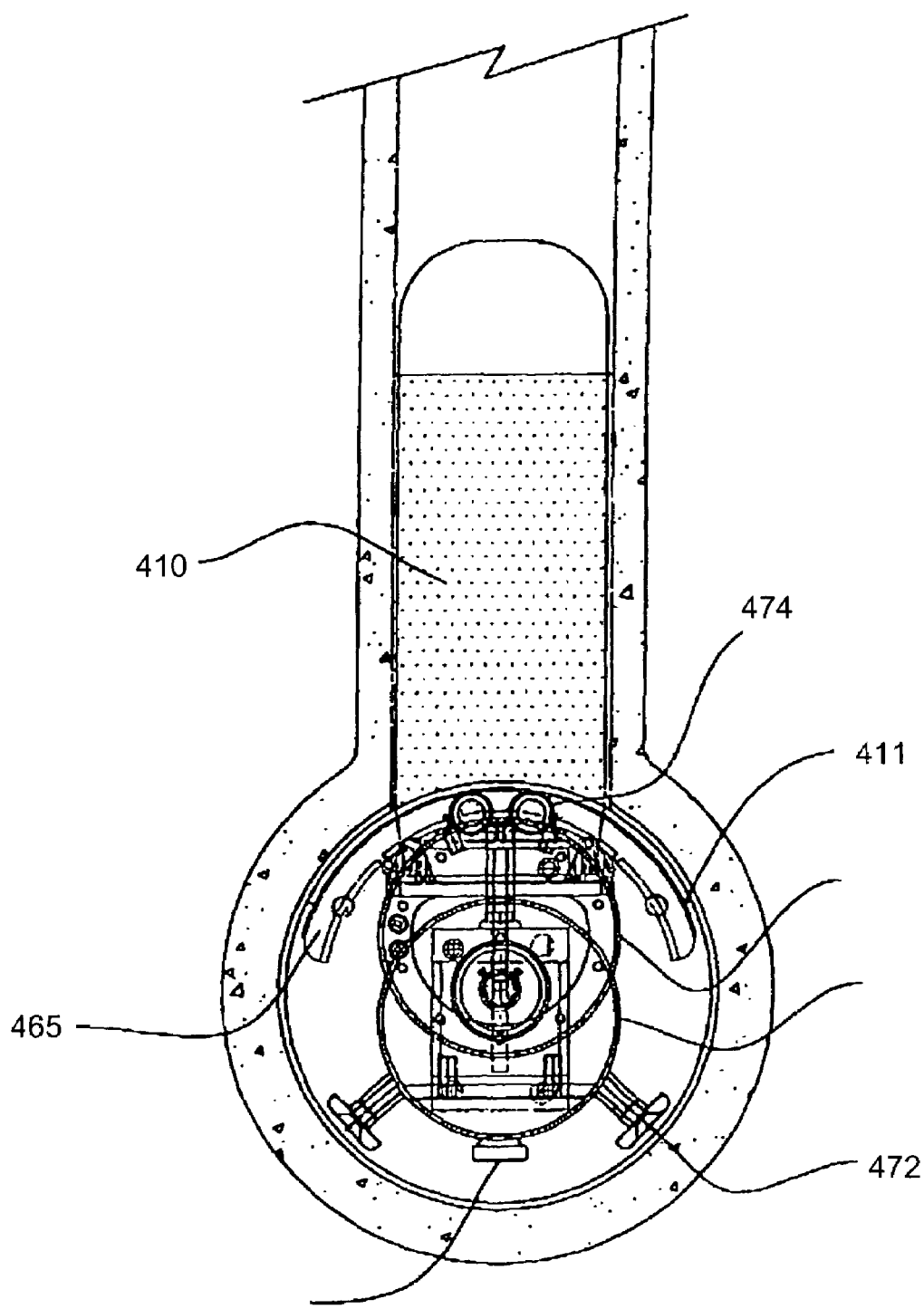

FIG. 5D illustrates the apparatus used for placement of the flexible bladder 440 at the pipe interface section 400. The apparatus is positioned in radially and longitudinally within one pipe 200. The lift cylinders can be elevated by hydraulics or compressed air using a suitable medium. The lift cylinders are firmly attached to the front section 462 and rear section 461 with cylinder rams attached to the main body. When activated, cylinders 473 effectively lift the main body to force the top portion of the caul plate 465 to be in contact with the interior wall of the main line pipe at the area surrounding the lateral pipe opening. As the main body lifts, actuator arms 474 encounter the main line pipe wall, as depicted in FIGS. 5D and 5E. In FIG. 5E, the actuator arm bearings 474 convert the vertical motion to a lifting motion through a fulcrum attached to the main body. The opposite ends of the actuator arms are position under the wings 465 and cause the wings to unfold and compress the flanged area 411 of the repair material firmly against the main line pipe walls.

By introducing pressure to the interior of the main body through umbilical, the bladder and repair material is caused to invert into the lateral pipe. Increasing the pressure inside the bladder causes the tubular section of the repair material to conform to the inside geometry of the lateral pipe section.

The bladder and the caul plates may be constructed of a temperature resistant material and contain within the outer skin surface, electrically conductive fibers that are employed to produce heat when an electrical current passes through the fibers. The material surrounding the conductive fibers is a flexible, resilient substance such as silicone, fluorosilicone or fluoropolymer. Electrical wires conduct the electrical energy from remotely stationed, controllable power supplies to the electrically conductive fibers. Heating temperatures may be produced range between 200 F. to 400 F. depending on the cure requirements of the resin matrix selected for use in the repair material. These temperatures can be achieved in as little as 10 minutes enabling an extremely fast cure cycle.

In conjunction with the inflation of the bladder into the interior diameter of the pipe interface and the heating of the bladder and caul plate, reactants can be injected into the ground proximate to the interface to compact the soil and stabilize the soils adjacent to the pipe similar to the manner discussed earlier in regard to FIGS. 2 through 4B above. The inverted bladder thereby also serves to minimize the infiltration of injected reactant or reaction product into the interior diameter. Further, it will be readily appreciated that the heat of the bladder, caul plates or liner may be available to radiate through the thickness of the pipe wall to facilitate the cure of the injected reactant. Again, this heat source may also allow the use of reactants that are not effective in the ambient subsurface environment.

While specific embodiments have been illustrated and described, numerous modification are possible without departing from the spirit of the invention, as the scope of protection is only limited by the scope of the accompany claims.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What is claimed is:

1. A method for insitu minimization of infiltration and exfiltration of underground pipes having thickness between a first inner surface and a second outer surface comprising the following steps:
   a. Inserting into a pipe an inflatable and heatable bladder in communication with a controller and power source;
   b. Inflating the bladder to contact the first inner pipe surface;
   c. Heating the bladder to radiate heat through the pipe thickness to the ground;
   d. Injecting at least one chemical reactant into the ground from a ground surface;
   e. Using heat radiated through the pipe thickness to create a reaction product from the injected chemical reactant;
   f. Removing the bladder.

2. The invention of claim 1 wherein the means for heating is resistive electric heating within the bladder.

3. The invention of claim 1 wherein the reaction product is closed cell foam.

4. The invention of claim 1 wherein the bladder is in circumferential contact with the first inner surface of the pipe.

5. The invention of claim 1 wherein the reaction product reduces spaces within the ground and between the ground and the second outer pipe surface.

6. The invention of claim 1 further comprising placement of at least one liner material between the bladder and the first inner surface of the pipe wall.

7. The invention of claim 1 wherein the reactant is selected from a group consisting of a hybrid polyurethane or polyester/polyurethane blend resin, and epoxy resins combined with diluents, catalysts, blowing agents and surfactants, a acrylimide, and cementitous slurry.

8. The invention of claim 2 wherein the means of resistive electric heating is carbon fibers.

9. A method for insitu minimization of infiltration and exfiltration of underground pipes having thickness between a first inner surface and a second outer surface comprising the following steps:
   a. Inserting into the pipe a heatable and inflatable bladder in communication with the ground surface and having one or more liners containing thermo-setting or thermoplastic material;
   b. Inflating the bladder to press the liner to the first inner surface of the pipe;
   c. Injecting a reactant into the ground from the ground surface;
   d. Controllably heating the bladder to radiate heat through the thickness of the pipe to the ground proximate to the second outer surface;
   e. Using the heat to form the liner to the shape of the inner surface of the pipe;
   f. using the radiated heat through the thickness of the pipe in creating a closed cell foam reaction product from the injected reactant; and
   g. removing the inflatable bladder component.

10. The method of claim 9 wherein the method of heating is resistive electric heating.

11. The method of claim 9 wherein the ground proximate to the second outer surface of the pipe is heated prior to insertion of the reactant.

12. The method of claim 9 wherein the thermosetting material of the outer liner cures while pressed to the first interior surface by the inflated inner bladder.

13. A method for repairing an interface area between two intersecting pipes, each having a pipe wall thickness between a first inner surface and an outer surface and an interior diameter formed by the first inner surface, comprising the following steps:
   a. providing a flexible and expandable liner containing a hardenable heat responsive material wherein the liner has a cylindrical portion with a longitudinal axis of orientation and an outward protruding flange portion;
   b. placing the liner on an expandable and heatable mold;
   a. inserting the mold and liner into the interior diameter of the pipe interface of a first pipe and a second pipe;
   d. maintaining communication and power means to the mold from a controller;
   e. expanding the mold device to press the cylindrical liner segment to the inner surface of the first pipe and the liner flange segment to the inner surface of the second pipe;
   f. injecting a reactant from a ground surface into the ground proximate to the outer pipe surfaces at the interface;
   g. controllably heating the mold to radiate heat to the liner and through the thickness of the pipe to the ground;
   h. using the heat to form the liner to the shape of the inner diameter of the first pipe and the inner surface of the second pipe at the interface with the first pipe;
   i. Using the radiated heat in creating a reaction product of expanding close cell foam; and
   j. removing the mold.

14. A method for insitu repair of underground pipes comprising the following steps:
   a. Inserting an inflatable bladder into an annulus of a pipe;
   b. Inflating the bladder to contact a first inner pipe surface;
   c. Injecting at least one chemical reactant into the ground through a mechanism inserted from the around surface into the ground outside of the pipe;
   d. Using the inflated bladder to minimize the infiltration of the reactant or a resulting reaction product into the pipe annulus; and
   f. Removing the bladder.

* * * * *